United States Patent
Lütgehetmann et al.

(10) Patent No.: US 12,380,599 B2
(45) Date of Patent: Aug. 5, 2025

(54) CHARACTERIZING AND IMPROVING OF IMAGE PROCESSING

(71) Applicant: INAIT SA, Lausanne (CH)

(72) Inventors: Daniel Milan Lütgehetmann, Lausanne (CH); Dimitri Zaganidis, Granges (CH); Nicolas Alain Berger, Fribourg (CH); Felix Schürmann, Grens (CH)

(73) Assignee: INAIT SA, Lausanne (CH)

( * ) Notice: Subject to any disclaimer, the term of this patent is extended or adjusted under 35 U.S.C. 154(b) by 628 days.

(21) Appl. No.: 17/454,347

(22) Filed: Nov. 10, 2021

(65) Prior Publication Data

US 2023/0085384 A1 Mar. 16, 2023

(30) Foreign Application Priority Data

Sep. 13, 2021 (GR) ................ 20210100602

(51) Int. Cl.
*G06K 9/00* (2022.01)
*G06T 7/73* (2017.01)
*H04N 23/60* (2023.01)

(52) U.S. Cl.
CPC .......... *G06T 7/75* (2017.01); *G06T 7/74* (2017.01); *H04N 23/64* (2023.01); *G06T 2207/30244* (2013.01)

(58) Field of Classification Search
None
See application file for complete search history.

(56) References Cited

U.S. PATENT DOCUMENTS

| 5,822,742 A | 10/1998 | Alkon et al. |
| 7,321,882 B2 | 1/2008 | Herbert |
| (Continued) | | |

FOREIGN PATENT DOCUMENTS

| CN | 101669130 | 3/2010 |
| CN | 101719908 A | 6/2010 |
| (Continued) | | |

OTHER PUBLICATIONS

Achard et al., "A Resilient, Low-Frequency, Small-World Human Brain Functional Network with Highly Connected Association Cortical Hubs," Journal of Neuroscience, Jan. 4, 2006, 26(1):63-72.

(Continued)

*Primary Examiner* — Wei Wen Yang
(74) *Attorney, Agent, or Firm* — Fish & Richardson P.C.

(57) ABSTRACT

A method for characterizing correctness of image processing includes receiving images of an instance of an object, wherein the images were acquired at different relative poses, identifying positions of corresponding landmarks on the object in each of the received images, receiving information characterizing a difference in position or a difference in orientation of at least one of the instance of the object and one or more imaging devices when the images were acquired, transferring the positions of landmarks identified in a first of the images based on the difference in position or the difference in orientation, and comparing the positions of the transferred landmarks with the positions of the corresponding of the landmarks identified in a second of the received images, and characterizing a correctness of the identification of the positions of the landmarks in at least one of the received images.

8 Claims, 8 Drawing Sheets

(56) References Cited

U.S. PATENT DOCUMENTS

| | | |
|---|---|---|
| 7,412,426 B2 | 8/2008 | Hercus |
| 8,818,923 B1 | 8/2014 | Hoffmann |
| 9,336,239 B1 | 5/2016 | Hoffmann et al. |
| 9,558,442 B2 | 1/2017 | Canoy et al. |
| 9,785,886 B1 | 10/2017 | Andoni et al. |
| 9,875,440 B1 | 1/2018 | Lamport |
| 10,019,506 B1 | 7/2018 | Li et al. |
| 10,153,806 B1 | 12/2018 | Petre et al. |
| 10,417,558 B1 | 9/2019 | Bauer et al. |
| 10,510,000 B1 | 12/2019 | Lamport |
| 10,621,364 B1 | 4/2020 | El Defrawy |
| 10,628,486 B2 | 4/2020 | Chu et al. |
| 10,650,047 B2 | 5/2020 | Yanagisawa |
| 10,885,020 B1 | 1/2021 | Ablitt |
| 10,922,510 B2 | 2/2021 | Tscherepanow et al. |
| 11,195,038 B2 | 12/2021 | Nunn et al. |
| 11,218,498 B2 | 1/2022 | Hajimirsadeghi et al. |
| 11,250,326 B1 | 2/2022 | Ko et al. |
| 11,278,413 B1 | 3/2022 | Lang |
| 11,569,978 B2 | 1/2023 | Hess et al. |
| 11,580,401 B2 | 2/2023 | Markram et al. |
| 11,615,285 B2 | 3/2023 | Reimann et al. |
| 11,651,210 B2 | 5/2023 | Henry et al. |
| 11,652,603 B2 | 5/2023 | Markram et al. |
| 11,663,478 B2 | 5/2023 | Markram et al. |
| 11,797,827 B2 | 10/2023 | Markram et al. |
| 11,816,553 B2 | 11/2023 | Markram et al. |
| 11,893,471 B2 | 2/2024 | Markram et al. |
| 11,972,343 B2 | 4/2024 | Markram et al. |
| 12,020,157 B2 | 6/2024 | Markram et al. |
| 12,113,891 B2 | 10/2024 | Hess Bellwald et al. |
| 12,147,904 B2 | 11/2024 | Markram et al. |
| 12,154,023 B2 | 11/2024 | Markram et al. |
| 2004/0015459 A1 | 1/2004 | Herbert |
| 2006/0112028 A1 | 5/2006 | Xiao et al. |
| 2006/0184471 A1 | 8/2006 | Minamino et al. |
| 2008/0152217 A1 | 6/2008 | Greer |
| 2009/0006060 A1 | 1/2009 | Rhodes |
| 2009/0012581 A1 | 1/2009 | Rhodes |
| 2009/0187736 A1 | 7/2009 | Raichelgauz et al. |
| 2014/0156901 A1 | 6/2014 | Raichelgauz et al. |
| 2015/0058352 A1 | 2/2015 | Brand |
| 2015/0206049 A1 | 7/2015 | Canoy et al. |
| 2015/0280906 A1 | 10/2015 | Shany et al. |
| 2015/0310303 A1 | 10/2015 | Andreopoulos et al. |
| 2015/0347870 A1 | 12/2015 | Andreopoulos et al. |
| 2015/0363689 A1 | 12/2015 | Henry et al. |
| 2016/0048756 A1 | 2/2016 | Hall et al. |
| 2016/0350648 A1 | 12/2016 | Gilad-Bachrach et al. |
| 2017/0124452 A1 | 5/2017 | Tucker et al. |
| 2017/0139759 A1 | 5/2017 | Bandara |
| 2017/0213131 A1 | 7/2017 | Hammond et al. |
| 2017/0229117 A1 | 8/2017 | van der Made et al. |
| 2017/0249536 A1 | 8/2017 | Hillar et al. |
| 2018/0005111 A1 | 1/2018 | Chaudhari et al. |
| 2018/0018553 A1 | 1/2018 | Bach et al. |
| 2018/0053108 A1 | 2/2018 | Olabiyi et al. |
| 2018/0053114 A1 | 2/2018 | Adjaoute |
| 2018/0082171 A1 | 3/2018 | Merity et al. |
| 2018/0107922 A1 | 4/2018 | Paul et al. |
| 2018/0136912 A1 | 5/2018 | Venkataramani et al. |
| 2018/0157973 A1 | 6/2018 | El-Yaniv et al. |
| 2018/0165547 A1 | 6/2018 | Huang et al. |
| 2018/0197069 A1 | 7/2018 | Reimann et al. |
| 2018/0197076 A1 | 7/2018 | Paik et al. |
| 2018/0247198 A1 | 8/2018 | Vasudevan et al. |
| 2018/0336453 A1 | 11/2018 | Merity et al. |
| 2018/0373985 A1 | 12/2018 | Yang et al. |
| 2019/0012574 A1 | 1/2019 | Anthony et al. |
| 2019/0036678 A1 | 1/2019 | Ahmed |
| 2019/0042988 A1 | 2/2019 | Brown et al. |
| 2019/0044916 A1 | 2/2019 | Jones |
| 2019/0050726 A1 | 2/2019 | Azaria et al. |
| 2019/0122096 A1 | 4/2019 | Husain |
| 2019/0122140 A1 | 4/2019 | Sen |
| 2019/0171187 A1 | 6/2019 | Cella et al. |
| 2019/0171929 A1 | 6/2019 | Abadi et al. |
| 2019/0197410 A1 | 6/2019 | Berry, II |
| 2019/0228300 A1 | 7/2019 | Cao et al. |
| 2019/0244348 A1 | 8/2019 | Buckler et al. |
| 2019/0266246 A1 | 8/2019 | Wang et al. |
| 2019/0286074 A1 | 9/2019 | Hoffman |
| 2019/0304568 A1 | 10/2019 | Wei et al. |
| 2019/0312898 A1 | 10/2019 | Verma et al. |
| 2019/0335192 A1 | 10/2019 | Otto et al. |
| 2019/0354846 A1 | 11/2019 | Mellempudi et al. |
| 2019/0370647 A1 | 12/2019 | Doshi et al. |
| 2019/0377976 A1 | 12/2019 | Markram et al. |
| 2019/0377999 A1 | 12/2019 | Markram et al. |
| 2019/0378000 A1 | 12/2019 | Markram et al. |
| 2019/0378007 A1 | 12/2019 | Markram et al. |
| 2019/0378008 A1 | 12/2019 | Markram et al. |
| 2019/0392303 A1 | 12/2019 | Cherubini et al. |
| 2020/0011668 A1* | 1/2020 | Derhy .............. A61B 1/000094 |
| 2020/0012927 A1 | 1/2020 | Raichelgauz et al. |
| 2020/0098135 A1* | 3/2020 | Ganjineh ............. G06V 20/588 |
| 2020/0117690 A1 | 4/2020 | Tran |
| 2020/0126126 A1 | 4/2020 | Briancon et al. |
| 2020/0134016 A1 | 4/2020 | Cao et al. |
| 2020/0184055 A1 | 6/2020 | Storm et al. |
| 2020/0210764 A1 | 7/2020 | Hamedi et al. |
| 2020/0228336 A1 | 7/2020 | Streit |
| 2020/0242444 A1 | 7/2020 | Zhang et al. |
| 2020/0285944 A1 | 9/2020 | Lee et al. |
| 2020/0302297 A1 | 9/2020 | Jaganathan et al. |
| 2020/0304284 A1 | 9/2020 | Markram et al. |
| 2020/0304285 A1 | 9/2020 | Hess et al. |
| 2020/0310400 A1 | 10/2020 | Jha et al. |
| 2020/0367810 A1 | 11/2020 | Shouldice et al. |
| 2020/0380335 A1 | 12/2020 | Neznal |
| 2020/0402497 A1 | 12/2020 | Semonov et al. |
| 2021/0027163 A1 | 1/2021 | Baker |
| 2021/0049441 A1 | 2/2021 | Bronstein |
| 2021/0049446 A1 | 2/2021 | Gurumurthi et al. |
| 2021/0058547 A1 | 2/2021 | Puttamalla et al. |
| 2021/0097578 A1 | 4/2021 | Holmes et al. |
| 2021/0110115 A1 | 4/2021 | Hermann et al. |
| 2021/0182604 A1 | 6/2021 | Anthony et al. |
| 2021/0182653 A1 | 6/2021 | Markram et al. |
| 2021/0182654 A1 | 6/2021 | Markram et al. |
| 2021/0182655 A1 | 6/2021 | Markram et al. |
| 2021/0182657 A1 | 6/2021 | Markram et al. |
| 2021/0182681 A1 | 6/2021 | Markram et al. |
| 2021/0271319 A1 | 9/2021 | Lussier et al. |
| 2021/0338007 A1 | 11/2021 | Choi et al. |
| 2021/0398621 A1 | 12/2021 | Stojevic et al. |
| 2022/0005332 A1 | 1/2022 | Metzler et al. |
| 2022/0012877 A1 | 1/2022 | Buckler et al. |
| 2022/0147760 A1 | 5/2022 | Dutta et al. |
| 2022/0148454 A1 | 5/2022 | Jaramaz et al. |
| 2022/0157436 A1 | 5/2022 | Harley et al. |
| 2022/0187847 A1 | 6/2022 | Cella et al. |
| 2022/0197306 A1 | 6/2022 | Cella et al. |
| 2022/0261593 A1 | 8/2022 | Yu et al. |
| 2022/0269346 A1 | 8/2022 | Hussami et al. |
| 2023/0019839 A1 | 1/2023 | Markram |
| 2023/0024925 A1 | 1/2023 | Markram et al. |
| 2023/0028511 A1 | 1/2023 | Markram et al. |
| 2023/0171086 A1 | 6/2023 | Hess et al. |
| 2023/0297808 A1 | 9/2023 | Reimann et al. |
| 2023/0316077 A1 | 10/2023 | Markram et al. |
| 2023/0351196 A1 | 11/2023 | Markram et al. |
| 2023/0370244 A1 | 11/2023 | Markram et al. |
| 2024/0046077 A1 | 2/2024 | Markram et al. |
| 2024/0111994 A1 | 4/2024 | Markram et al. |
| 2024/0176985 A1 | 5/2024 | Markram et al. |
| 2024/0362480 A1 | 10/2024 | Markram et al. |
| 2024/0386265 A1 | 11/2024 | Markram et al. |

FOREIGN PATENT DOCUMENTS

| | | |
|---|---|---|
| CN | 102859538 | 1/2013 |
| CN | 103988203 | 8/2014 |
| CN | 104318304 | 1/2015 |

(56) References Cited

FOREIGN PATENT DOCUMENTS

| | | |
|---|---|---|
| CN | 104335219 | 2/2015 |
| CN | 105095966 | 11/2015 |
| CN | 106156845 | 11/2016 |
| CN | 107247989 | 10/2017 |
| CN | 107423814 | 12/2017 |
| CN | 107844830 | 3/2018 |
| CN | 108348750 | 7/2018 |
| CN | 112567387 | 3/2021 |
| CN | 112567388 | 3/2021 |
| CN | 112567389 | 3/2021 |
| CN | 112567390 | 3/2021 |
| CN | 112585621 | 3/2021 |
| EP | 1283496 | 2/2003 |
| EP | 3340121 | 6/2018 |
| EP | 3803699 | 4/2021 |
| EP | 3803705 | 4/2021 |
| EP | 3803706 | 4/2021 |
| EP | 3803707 | 4/2021 |
| EP | 3803708 | 4/2021 |
| KR | 20120123698 | 11/2012 |
| KR | 20210008417 | 1/2021 |
| KR | 20210008418 | 1/2021 |
| KR | 20210008419 | 1/2021 |
| KR | 20210008858 | 1/2021 |
| KR | 20210010894 | 1/2021 |
| TW | 201437945 | 10/2014 |
| TW | 201535277 | 9/2015 |
| TW | 201725519 | 7/2017 |
| TW | I608429 | 12/2017 |
| TW | 201928789 | 7/2019 |
| TW | 201935326 | 9/2019 |
| TW | 201937392 | 9/2019 |
| WO | WO 2007/137047 | 11/2007 |
| WO | WO 2016/206765 | 12/2016 |
| WO | WO 2017/083399 | 5/2017 |
| WO | WO 2017/197375 | 11/2017 |
| WO | WO 2017/200971 | 11/2017 |
| WO | WO 2018/058426 | 4/2018 |
| WO | WO 2018/175400 | 9/2018 |
| WO | WO 2019/238483 | 12/2019 |
| WO | WO 2019/238512 | 12/2019 |
| WO | WO 2019/238513 | 12/2019 |
| WO | WO 2019/238522 | 12/2019 |
| WO | WO 2019/238523 | 12/2019 |
| WO | WO 2020/187676 | 9/2020 |
| WO | WO 2020/187694 | 9/2020 |
| WO | WO 2021/116071 | 6/2021 |
| WO | WO 2021/116075 | 6/2021 |
| WO | WO 2021/116140 | 6/2021 |
| WO | WO 2021/116147 | 6/2021 |
| WO | WO 2021/116250 | 6/2021 |
| WO | WO 2021/116379 | 6/2021 |
| WO | WO 2021/116402 | 6/2021 |
| WO | WO 2021/116404 | 6/2021 |
| WO | WO 2021/116407 | 6/2021 |

OTHER PUBLICATIONS

Arai et al., "The Effects of Theta Precession on Spatial Learning and Simplicial Complex Dynamics in a Topological Model of the Hippocampal Spatial Map," PLOS Computational Biology, Jun. 19, 2014, 10(6):r1003651.

Astrivis [online], "Demo Scan Church Dec. 2016," Dec. 2, 2016, retrieved on Nov. 27, 2022, retrieved from URL <https://www.youtube.com/watch?v=xCgQ4aaB1Go>, 2 pages [Video Submission].

Bassett et al., "Dynamic reconfiguration of human brain networks during learning," PNAS, Apr. 18, 2011, 108(18):7641-7646.

Brown et al., "Structure of the Afferent Terminals in Terminal Ganglion of a Cricket and Persistent Homology," PLOS One, May 23, 2012, 7(5):e37278.

Chen et al., "Neural Representation of Spatial Topology in the Rodent Hippocampus," Neural Computation, Jan. 2014, 26(1):1-39.

Choi et al., "Abnormal metabolic connectivity in the pilocarpine-induced epilepsy rat model: A multiscale network analysis based on persistent homology," NeuroImage, Oct. 1, 2014, 99:226-236.

Chung et al., "Persistence Diagrams of Cortical Surface Data," Information Processing in Medical Imaging, 2009, pp. 386-397.

Crossley et al., "Cognitive relevance of the community structure of the human brain functional coactivation network," PNAS, Jun. 24, 2013, 110(28):11583-11588.

Dongjiang et al., "DXSLAM: A Robust and Efficient Visual SLAM System with Deep Features," ArXiv, Aug. 12, 2020, 8 pages.

Drakesmith et al., "Overcoming the effects of false positives and threshold bias in graph theoretical analyses of neuroimaging data," NeuroImage, Sep. 2015, 118:313-333.

Ellis et al., "Describing High-Order Statistical Dependence Using "Concurrence Topology," With Application to Functional MRI Brain Data," Homology, Homotopy and Applications, 2014, 16(1):245-264.

Garrison et al., "The (in)stability of functional brain network measures across thresholds," NeuroImage, Sep. 2015, 118:651-661.

Ginestet et al., "Brain Network Analysis: Separating Cost from Topology Using Cost-Integration," PLOS One, Jul. 28, 2018, 2011, 6(7):e21570.

International Search Report and Written Opinion in International Appln. No. PCT/EP2022/073852, mailed on Dec. 9, 2022, 18 pages.

Khalid et al., "Tracing the evolution of multi-scale functional networks in a mouse model of depression using persistent brain network homology," NeuroImage, Nov. 1, 2014, 101:351-363.

Kim et al., Morphological brain network assessed using graph theory and network filtration in deaf adults, Hearing Research, Sep. 2014, 315:88-98.

Langer et al., "The Problem of Thresholding in Small-World Network Analysis," PLOS One, Jan. 3, 2013, 8(1):e53199.

Lee et al., "Discriminative persistent homology of brain networks," 2011 IEEE International Symposium on Biomedical Imaging: From Nano to Macro, Mar. 30, 2011, pp. 841-844.

Lucky Robot [online], "ORB SLAM3: AR demo," Feb. 23, 2021, retrieved on Nov. 27, 2022, retrieved from URL <https://www.youtube.com/watch?v=c1ExX_IA5tM>, 2 pages [Video Submission].

Medaglia et al., "Cognitive Network Neuroscience," Journal of Cognitive Neuroscience, Aug. 1, 2015, 27(8):1471-1491.

Mur-Artal et al., "ORB-SLAM2: an Open-Source SLAM System for Monocular, Stereo and RGB-D Cameras," IEEE Transactions on Robotics, Oct. 5, 2015, 31(5):1147-1163.

Pirino et al., "A topological study of repetitive co-activation networks in in vitro cortical assemblies," Physical Biology, Jan. 5, 2015, 12(1):016007.

Singh et al., "Topological analysis of population activity in visual cortex," Journal of Vision, Jun. 2008, 8(8):11, 18 pages.

Stolz, "Computational Topology in Neuroscience," Dissertation for the Degree of Master of Science in Mathematical Modelling & Scientific Computing at the University of Oxford, Sep. 2014, 77 pages.

U.S. Appl. No. 16/004,635, filed Jun. 11, 2018, Markram.
U.S. Appl. No. 16/004,837, filed Jun. 11, 2018, Markram.
U.S. Appl. No. 16/004,796, filed Jun. 11, 2018, Markram.
U.S. Appl. No. 16/004,757, filed Jun. 11, 2018, Markram.
U.S. Appl. No. 16/004,671, filed Jun. 11, 2018, Markram.
U.S. Appl. No. 16/356,391, filed Mar. 18, 2019, Markram.
U.S. Appl. No. 16/356,478, filed Mar. 18, 2019, Hess.
U.S. Appl. No. 16/710,266, filed Dec. 11, 2019, Markram.
U.S. Appl. No. 16/710,058, filed Dec. 11, 2019, Markram.
U.S. Appl. No. 16/710,205, filed Dec. 11, 2019, Markram.
U.S. Appl. No. 16/710,176, filed Dec. 11, 2019, Markram.
U.S. Appl. No. 16/710,080, filed Dec. 11, 2019, Markram.
U.S. Appl. No. 17/783,976, filed Jun. 9, 2022, Markram.
U.S. Appl. No. 17/783,978, filed Jun. 9, 2022, Markram.
U.S. Appl. No. 17/783,981, filed Jun. 9, 2022, Markram.
U.S. Appl. No. 15/864,146, filed Jan. 8, 2018, Reimann.
Office Action in European Appln. No. 19728992.9, mailed on Jan. 24, 2023, 8 pages.
Office Action in European Appln. No. 19728993.7, mailed Jan. 24, 2023, 8 pages.

(56) References Cited

OTHER PUBLICATIONS

Office Action in European Appln. No. 20829805.9, mailed Sep. 14, 2023, 10 pages.
Office Action in U.S. Appl. No. 16/004,796, dated Dec. 15, 2023, 33 pages.
Office Action in U.S. Appl. No. 16/004,796, dated Jun. 29, 2023, 31 pages.
Office Action in U.S. Appl. No. 18/161,414, dated Dec. 21, 2023, 33 pages.
U.S. Appl. No. 18/295,959, filed Apr. 5, 2023, Markram.
U.S. Appl. No. 18/161,414, filed Jan. 30, 2023, Hess.
U.S. Appl. No. 18/480,927, filed Oct. 20, 2023, Markram et al.
U.S. Appl. No. 18/487,566, filed Oct. 16, 2023, Markram et al.
U.S. Appl. No. 18/295,969, filed Apr. 5, 2023, Henry.
U.S. Appl. No. 18/188,888, filed Mar. 23, 2023, Reimann.
Office Action in U.S. Appl. No. 16/710,266, dated Nov. 17, 2022, 32 pages.
Curto et al., "Cell groups reveal structure of stimulus space," Plos Comput. Biol., Oct. 2008, 4(10):e100205.
Curto, "What Can Topology Tell Us About the Neural Code?," The American Mathematical Society, Jan. 2017, 54(1):63-78.
Dabaghian et al., "A topological paradigm for hippocampal spatial map formation using persistent homology," Plos Comput. Biol., Aug. 2012, 8(8):e1002581.
Dabaghian et al., "Reconceiving the hippocampal map as a topological template," Elife, Aug. 20, 2014, 3:e03476.
DeCharms et al., "Primary cortical representation of sounds by the coordination of action-potential timing," Nature, Jun. 13, 1996, 381(6583):610-613.
Jozefowicz et al., "An Empirical Exploration of Recurrent Network Architectures," Proceedings of the 32nd International Conference on Machine Learning, 2015, 37:1-9.
Office Action in U.S. Appl. No. 16/004,671, dated Oct. 27, 2022, 40 pages.
Office Action in U.S. Appl. No. 16/710,2056, dated Oct. 26, 2022, 51 pages.
Abbas et al., "Artificial Intelligence Conquering the next frontier of the digital world," Research Gate, Dec. 17, 2017, 15 pages.
Aharoni et al. "Eigenvalues and homology of flag complexes and vector representations of graphs," Geom. Funct. Anal., Jul. 28, 2005, 15:555-566.
Alaniz, "Machiavellian Playbook for Artificial General Intelligence (AGI), Early Doctrine for AGI power," Research Gate, Aug. 2018, pp. 1-42.
Alaniz, "Remaking Einstein with a Dynamical Graph Rich Person Object Avatar Extraction Markup Language (intelligence as topological algebraic invariants, graph entropies, and dynamics)," Mar. 16, 2019, 14 pages.
Allswede et al., "Prenatal inflammation and risk for schizophrenia: A role for immune proteins in neurodevelopment," Development and Psychopathology, Aug. 2, 2018, 30: 1157-1178.
Andersen et al., "Overlapping clusters for distributed computation," In Proceedings of the Fifth ACM International Conference on Web Search and Data Mining, Feb. 8, 2012, 9 pages.
Angeli, "Symmetric functions for fast image retrieval with persistent homology," Math Meth Appl Sci., Apr. 24, 2018, 41:9567-9577.
Antonopoulos et al., "Evaluating performance of neural codes in neural communication networks," Neural Networks, Sep. 24, 2018, pp. 1-17.
Bahraini et al., "Topological pattern selection in recurrent networks," Neural Networks, Feb. 9, 2012, 31:22-32.
Baker et al., "Designing neural network architectures using reinforcement learning," arXiv preprint, arXiv:1611.02167, Nov. 7, 2016, 18 pages.
Bale et al., "Efficient population coding of naturalistic whisker motion in the ventro-posterior medial thalamus based on precise spike timing," Front. Neural Circuits, Sep. 25, 2015, 9: 1-14.
Baptiste-Bardin et al., "Topological exploration of artificial neuronal network dynamics," Network Neuroscience, Jan. 24, 2019, pp. 1-28.
Baskararaja et al., "Subgraph matching using graph neural network," Journal of Intelligent Learning Systems and Applications, Nov. 28, 2012, 4(04):274-278.
Basset et al., "Network models in neuroscience," arXiv, Jul. 21, 2018, pp. 1-12.
Basset et al., "On the nature and use of models in network neuroscience," Nature Reviews, Jul. 12, 2018, 19:566-578.
Bassett et al., "Network Neuroscience," Network Neuroscience, Nat. Neurosci., Mar. 20, 2017, 20:353-364.
Baudot et al., "Topological Information Data Analysis," Entropy, Sep. 2019, 21:1-38.
Bauer et al., "Clear and Compress: Computing Persistent Homology in Chunks," *Topological Methods in Data Analysis and Visualization III.*, 2014, pp. 103-117.
Bauer et al., "PHAT—Persistent Homology Algorithms Toolbox," J. Symb. Comput., Jan. 1, 2017, 78: 76-90.
Bauer et al., "Real-time ultra-low power ECG anomaly detection using an event-driven neuromorphic processor," IEEE transactions on biomedical circuits and systems, Nov. 11, 2019, 13(6):1575-82.
Bergomi et al., "Topological Graph persistence," Mathematics, Jul. 20, 2017, pp. 1-15.
Betzel, "Stability of spontaneous, correlated activity in mouse auditory cortex," PLOS: Computational Biology, Dec. 9, 2019, 1-25.
Bianconi et al., "Topological percolation on hyperbolic simplicial complexes," Phys. Rev. E, Nov. 21, 2018, 5:1-18.
Bienenstock et al., "A model of neocortex," Network Comput. Neural Syst., Jul. 27, 1994, 6:179-224.
Blanco et al., "A genetic algorithm to obtain the optimal recurrent neural network," International Journal of Approximate Reasoning, Jan. 2000, 23(1):67-83.
Brody et al., "Correlations without synchrony," Neural Comput. 11, Oct. 1, 1999, 11:1537-1551.
Bullmore et al., "Complex brain networks: graph theoretical analysis of structural and functional systems," Nat. Rev. Neurosci., Mar. 10, 2009, 10:186-198.
Busch et al., "Intrinsic temporal tuning of neurons in the optic tectum is shaped by multisensory experience," Journal of Neurophysiology, Sep. 5, 2019, pp. 1-23.
Cai et al., "Path-level network transformation for efficient architecture search," In International Conference on Machine Learning, Jul. 3, 2018 PMLR, 10 pages.
Chacholski et al., "On the topology of complexes of injective words," Journal of Applied and Computational Topology, Aug. 16, 2019, 21:1-16.
Chambers et al., "Higher-order synaptic interactions coordinate dynamics in recurrent networks," PLoS computational biology, Aug. 19, 2016, 12(8):e1005078, 23 pages.
Chella et al., "Representational Issues in the Debate on the Standard Model of the Mind," Association for the Advancement of Artificial Intelligence, Nov. 12, 2017, pp. 1-6.
Chklovskii et al., "Cortical rewiring and information storage," Nature, Oct. 14, 2004, 431:782-788.
Choi et al., "A Survey of Binary Similarity and distance measures," Systemic, Cybernetics, and Informatics, Jan. 8, 2010, 8:43-48.
Choudhary, "Approximation algorithms for Vietoris-Rips and Čech filtrations," Doctoral Thesis of Computer Science, Faculty of Mathematics and Computer Science, Heidelberg University, Dec. 14, 2017, 140 pages.
Chowdhury et al., "Path homologies of deep feedforward networks," Arxiv, Oct. 16, 2019, pp. 1-6.
Coggan et al., "A Process for Digitizing and Simulating Biologically Realistic Oligocellular Networks Demonstrated for the Neuro-Glio-Vascular Ensemble," Neurosci, Sep. 25, 2018, 12:1-21.
Collins, "The case for emulating insect brains using anatomical "wiring diagrams" equipped with biophysical models of neuronal activity," Biological cybernetics, Dec. 1, 2019, 113: 465-75.
Cormen et al., "Introduction to Algorithms," Copyright 2001 by The Massachusetts Institute of Technology, 984 pages.
Courtney et al., "Dense Power-law Networks and Simplicial Complexes," ArXiv, Apr. 23, 2018, pp. 1-16.

(56) References Cited

OTHER PUBLICATIONS

Crawford et al., "A theory on the role of π-electrons of docosahexaenoic acid in brain function: The six methylene-interrupted double bonds and the precision of neural signaling," Oilseeds & fats Crops and Lipids, May 21, 2018, pp. 1-14.
Curto, "Relating network connectivity to dynamics: opportunities and challenges for theoretical neuroscience," Current Opinion in Neurobiology, Oct. 1, 2019, 58:11-20.
Davydov et al., "Neural Network Structures: Current and Future States," Research Gate, Feb. 2, 2018, pp. 1-6.
Djurfeldt et al., "Efficient generation of connectivity in neuronal networks from simulator-independent descriptions," Frontiers in Neuroinformatics, Mar. 28, 2014, 8(43):1-11.
Dlotko [online], "Directed clique topology," (slides are titled "Directed Complexes"), presented at BIRS workshop, video from 17w5043: Topological Methods in Brain Network Analysis, May 11, 2017, retrieved from <http://www.birs.ca/events/2017/5-day-workshops/17w5043/videos/watch/201705111127-Dlotko.html>, retrieved on Jul. 26, 2022, 26 pages.
Dlotko et al, "Topological analysis of the connectome of digital reconstructions of neural microcircuits," ArXiv, a working paper, Jan. 7, 2016, 1-28 pages.
Doborjeh et al., "Spiking Neural Network Modelling Approach Reveals How Mindfulness Training Rewires the Brain," Scientific Reports, Apr. 23, 2019, 9:1-15.
docs.opencv.org [online], "Camera Calibration and 3D Reconstruction," Apr. 14, 2020, retrieved on Oct. 5, 2022, retrieved from URL <https://docs.opencv.org/4.4.0/d9/doc/group_calib3d.html#ga549c2075fac14829ff4a58bc931c033d)>, 78 pages.
docs.opencv.org [online], "Pose Estimation," available no later than Sep. 13, 2021, retrieved on Oct. 5, 2022, retrieved from URL <https://docs.opencv.org/4.x/d7/d53/tutorial_py_pose.html>, 3 pages.
Ebli, "A Notion of Harmonic Clustering in Simplicial Complexes," Laboratory for Topology and Neuroscience, École Polytechnique Fédérale de Lausanne, 1015 Lausanne, Switzerland, Oct. 17, 2019, 9 pages.
Engel et al., "Temporal binding and the neural correlates of sensory awareness," Trends Cogn. Sci., Jan. 1, 2001, 5: 16-25.
Erdos and Renyi, "On random graphs, I," Math. Debrecen., 1959, 6:290-297.
Erdös et al., "On the evolution of random graphs," Publ. Math. Inst. Hung. Acad. Sci., Jan. 1960, 17-60.
Extended European Search Report in European Appln. No. 17174314.9, dated Dec. 14, 2017, 11 pages.
Extended European Search Report in European Appln. No. 17174316.4, dated Dec. 14, 2017, 11 pages.
Extended European Search Report in European Appln. No. 17174317.2, dated Dec. 14, 2017, 11 pages.
Fan et al., "A Brief History of Simulation Neuroscience," Front. Neuroinform., May 7, 2019, 13:1-28.
Feldbrugge et al., "Stochastic homology of Gaussian vs. non-Gaussian random fields: graphs towards Betti numbers and persistence diagrams," Journal of Cosmology and Astroparticle Physics, Sep. 24, 2019, 49 pages.
Feng et al., "Persistent Homology of Geospatial Data: A Case Study with Voting," Jan. 30, 2019, pp. 1-29.
Garcia et al., "Reconfigurations within resonating communities of brain regions following TMS reveal different scales of processing," BioRxiv, Jan. 9, 2020, pp. 1-39.
Garcia et al., "Unsupervised classification of neural spikes with a hybrid multilayer artificial neural network," Journal of Neuroscience Methods, 1998, 82:59-73.
Github.com [online] "pytorch-tutorial/tutorials/03-advanced/image_captioning/," Oct. 2007, retrieved on Jan. 21, 2020, retrieved from UR: <https://github.com/yunjey/pytorch-tutorial/tree/master/tutorials/03-advanced/image_captioning>, 3 pages.
Github.com [online], "facebookresearch/detectron2," 2019, retrieved on Oct. 5, 2022, retrieved from URL <https://github.com/facebookresearch/detectron2>, 4 pages.

Giusti et al., "Clique topology reveals intrinsic geometric structure in neural correlations," Proc. Natl. Acad. Sci. U.S.A., Apr. 28, 2015, 112:13455-13460.
Giusti et al., "Two's company, three (or more) is a simplex," Journal of computational neuroscience, Aug. 2016, 41(1):1-14.
Gleeson et al., "Open Source Brain: A Collaborative Resource for Visualizing, Analyzing, Simulating, and Developing Standardized Models of Neurons and Circuits," Neuron, Aug. 7, 2019, 103(3):395-411.e5.
Gong, "Evolution to a small-world network with chaotic units," Europhysics Letters (EPL), Jul. 15, 2004, 67:328-333.
Goodman et al., "Brian: a simulator for spiking neural networks in python," Frontiers in Neuroinformatics, Sep. 30, 2008, 2(5):1-10.
Graves, "Adaptive computation time for recurrent neural networks," arXiv preprint arXiv: 1603.08983, Mar. 29, 2016, 19 pages.
Gripon et al., "Sparse Neural Networks with Large Learning Diversity," IEEE Transactions on Neural Networks, Jul. 2011, 22(7):1087-1096.
Gros et al., "Semantic learning in autonomously active recurrent neural networks," Logic Journal of IGPL, Oct. 1, 2010, 18(5):686-704.
Gros, "Cognitive computation with autonomously active neural networks: an emerging field," Cognitive Computation, Mar. 2009, 1(1):77-90.
Gros, "Neural networks with transient state dynamics," New Journal of Physics, Apr. 30, 2007, 9(4):109, 21 pages.
Gros, "Self-sustained thought processes in a dense associative network," In Annual Conference on Artificial Intelligence, Sep. 11, 2005, Springer, Berlin, Heidelberg, 14 pages.
Guerreiro et al., "A Neural Key Generator for a Public Block Cipher," IEEE Ninth Brazilian Symposium on Neural Networks (SBRN '06), Oct. 23-27, 2006, Ribeirao Preto, BR, 143-147.
Guerreno, "The sleep onset transition: a connectivity investigation built on EEG source localization," University of Zurich, Facult of Science, Aug. 6, 2018, pp. 1-292.
Harris et al. "The neocortical circuit: themes and variations," Nat. Neurosci., Jan. 27, 2015, 18:170-181.
Hastings et al., "Challenges in the analysis of complex systems: introduction and overview," The European Physical Journal Special Topics, Dec. 28, 2017, 226:3185-3197.
Hatcher, "Algebraic Topology," Cambridge University Press, Feb. 2002, 556 pages.
Haun et al., "Conscious Perception as Integrated Information Patterns in Human Electrocorticography," eNeuro: Cognition and Behavior, Sep. 19, 2017, 4:2-18.
Hebb, "The Organization of Behavior: A Neuropsychological Theory," New York, NY: Wiley & Sons, 1949, pp. 1-365.
Hoan Tran et al., "Scale-variant topological information for characterizing the structure of complex networks," Physical Review E. Sep. 18, 2019, 100:1-18.
Holtmaat et al., "Experience-dependent structural synaptic plasticity in the mammalian brain," Nat. Rev. Neurosci., Sep. 10, 2009, 10: 647-658.
Hu et al., "Local paths to global coherence: cutting networks down to size," Phys. Rev. E, Mar. 10, 2014, 89: 1-16.
Ibanze-Marcelo et al., "Topology highlights mesoscopic functional equivalence between imagery and perception: The case of hypnotizability," NeuroImage, Jun. 19, 2019, 437-449.
Ignacio et al., "Classification of Single-lead Electrocardiograms: TDA Informed Machine Learning," ArXiv, Nov. 25, 2019, pp. 1-6.
Ignacio et al., "Tracing patterns and shapes in remittance and migration networks via persistent homology," EPJ Data Science, Jan. 5, 2019, 8:1-25.
International Preliminary Report on Patentability in International Appln. No. PCT/EP2020/056588, dated Sep. 30, 2021, 8 pages.
International Preliminary Report on Patentability in International Appln. No. PCT/EP2019/064593, dated Dec. 24, 2020, 11 pages.
International Preliminary Report on Patentability in International Appln. No. PCT/EP2019/064740, dated Dec. 24, 2020, 11 pages.
International Preliminary Report on Patentability in International Appln. No. PCT/EP2019/064741, dated Dec. 24, 2020, 9 pages.
International Preliminary Report on Patentability in International Appln. No. PCT/EP2019/064773, dated Dec. 24, 2020, 11 pages.

(56) References Cited

OTHER PUBLICATIONS

International Preliminary Report on Patentability in International Appln. No. PCT/EP2019/064776, dated Dec. 24, 2020, 11 pages.
International Preliminary Report on Patentability in International Appln. No. PCT/EP2020/056686, dated Sep. 30, 2021, 10 pages.
International Preliminary Report on Patentability in International Appln. No. PCT/EP2020/085007, dated Jun. 23, 2022, 8 pages.
International Preliminary Report on Patentability in International Appln. No. PCT/EP2020/085016, dated Jun. 23, 2022, 11 pages.
International Preliminary Report on Patentability in International Appln. No. PCT/EP2020/085169, dated Jun. 23, 2022, 8 pages.
International Preliminary Report on Patentability in International Appln. No. PCT/EP2020/085200, dated Jun. 23, 2022, 9 pages.
International Preliminary Report on Patentability in International Appln. No. PCT/EP2020/085434, dated Jun. 23, 2022, 9 pages.
International Preliminary Report on Patentability in International Appln. No. PCT/EP2020/085716, dated Jun. 23, 2022, 11 pages.
International Preliminary Report on Patentability in International Appln. No. PCT/EP2020/085750, mailed on Jun. 23, 2022, 8 pages.
International Preliminary Report on Patentability in International Appln. No. PCT/EP2020/085754, mailed Jun. 23, 2022, 12 pages.
International Preliminary Report on Patentability in International Appln. No. PCT/EP2020/085762, mailed on Jun. 23, 2022, 7 pages.
International Search Report and Written Opinion in International Appln. No. PCT/EP2019/064593, dated Sep. 6, 2019, 18 pages.
International Search Report and Written Opinion in International Appln. No. PCT/EP2019/064740, dated Sep. 6, 2019, 18 pages.
International Search Report and Written Opinion in International Appln. No. PCT/EP2019/064741, dated Sep. 6, 2019, 16 pages.
International Search Report and Written Opinion in International Appln. No. PCT/EP2019/064773, dated Sep. 6, 2019, 17 pages.
International Search Report and Written Opinion in International Appln. No. PCT/EP2019/064776, dated Sep. 6, 2019, 17 pages.
International Search Report and Written Opinion in International Appln. No. PCT/EP2020/056588, dated May 26, 2020, 12 pages.
International Search Report and Written Opinion in International Appln. No. PCT/EP2020/056686, dated May 26, 2020, 13 pages.
International Search Report and Written Opinion in International Appln. No. PCT/EP2020/085007, dated Mar. 24, 2021, 10 pages.
International Search Report and Written Opinion in International Appln. No. PCT/EP2020/085016, dated Mar. 24, 2021, 18 pages.
International Search Report and Written Opinion in International Appln. No. PCT/EP2020/085169, dated Mar. 18, 2021, 15 pages.
International Search Report and Written Opinion in International Appln. No. PCT/EP2020/085200, dated Apr. 9, 2021, 15 pages.
International Search Report and Written Opinion in International Appln. No. PCT/EP2020/085434, dated Mar. 24, 2021, 16 pages.
International Search Report and Written Opinion in International Appln. No. PCT/EP2020/085716, dated Mar. 25, 2021, 18 pages.
International Search Report and Written Opinion in International Appln. No. PCT/EP2020/085750, mailed on Apr. 6, 2021, 10 pages.
International Search Report and Written Opinion in International Appln. No. PCT/EP2020/085754, mailed Apr. 6, 2021, 14 pages.
International Search Report and Written Opinion in International Appln. No. PCT/EP2020/085762, mailed on Apr. 6, 2021, 9 pages.
Ivancevic et al., "Tensor-Centric Warfare II: Entropic Uncertainty Modeling," Intelligent Control and Automation, May 30, 2018, 9:30-51.
Ivancevic et al., "Tensor-Centric Warfare V: Topology of Systems Confrontation," Intelligent Control Automation, Feb. 28, 2019, 10:13-45.
Judge, "Prefix "Re-Cognition" as prelude to fixing sustainability—"pro" vs. "con"? Speculative review of missing emphasis potentially vital for psychosocial balance," Research Gate, Jul. 16, 2017, pp. 1-22.
Kahle, "Sharp vanishing thresholds for cohomology of random flag complexes," *Ann. Of Math.*, May 2014, 179(3):1085-1107.
Kanari et al, "A Topological Representation of Branching Neuronal Morphologies," Neuroinformatics, Oct. 3, 2017, 11 pages.
Kanari et al, "Quantifying topological invariants of neuronal morphologies," ArXiv, Mar. 28, 2016, 15 pages.
Kartun-Giles, "Beyond the clustering coefficient: A topological analysis of node neighborhoods in complex networks," Chaos, Solitons & Fractals: X, Feb. 16, 2019, 1:1-12.
Kastanenka et al., "A roadmap to integrate astrocytes into Systems Neuroscience," Gila, Wiley Periodicals, Apr. 9, 2019, pp. 1-22.
Khajezade et al., "A Game-Theoretical Network Formation Model for C. elegans Neural Network," Frontiers in Computational Neuroscience, Jul. 9, 2019, 13:1-12.
Knoblauch et al., "Memory capacities for synaptic and structural plasticity," Neural Comput., Feb. 2010, 22:289-341.
Kulakov, "Features of a Simple Psychophysiological Reaction," Human Physiology, Jun. 15, 2017, 44:412-417.
Kumarashinghe, "Deep learning and deep knowledge representation in Spiking Neural Networks for Brain-Computer Interface," Neural Networks, Sep. 20, 2019, 121:169-185.
Kumbhar et al., "CoreNeuron: An Optimized Compute Engine for the NEURON Simulator," Frontiers in Neuroinformatics, Sep. 4, 2019, pp. 1-27.
Kvam, "A geometric framework for modeling dynamic decisions among arbitrarily many alternatives," Journal of Mathematical Psychology, Aug. 1, 2019, 91:14-37.
Latora et al., "Efficient behavior of small-world networks," Phys. Rev. Lett., Oct. 17, 2001, 87:1-4.
Le Be et al., "Spontaneous and evoked synaptic rewiring in the neonatal neocortex," Proc. Natl. Acad. Sci. U.S.A., Aug. 29, 2006, 103:13214-13219.
Lee et al., "Detecting highly overlapping community structure by greedy clique expansion," arXiv preprint arXiv:1002.1827, Feb. 9, 2010, 10 pages.
Lena et al., "Deep spatio-temporal architectures and learning for protein structure prediction," Advances in neural information processing systems, 2012, 25, 9 pages.
Levi, "A short course on Algebraic topology geared towards applications to Neuroscience," University of Aberdeen, Jul. 18, 2017, pp. 1-14.
Li et al., "Ternary weight networks," arXiv preprint arXiv:1605.04711, May 16, 2016, 5 pages.
Liang et al., "Interpretable Structure-Evolving LSTM," 2017 IEEE Conference on Computervision and Pattern Recognition (CVPR), 2017, pp. 2175-2184.
Lin et al., "Organizing principles of real-time memory encoding: neural clique assemblies and universal neural codes," Trends in Neurosciences, Jan. 2006, 29(1):48-57.
Luccioli et al., "Modeling driver cells in developing neural networks," PLOS Computational Biology, Nov. 2, 2018, pp. 1-31.
Luczak et al., "Packetbased communication in the cortex," Nat. Rev. Neurosci., Oct. 28, 2015, 16:745-755.
Ludermir et al., "An optimization methodology for neural network weights and architectures," IEEE Transactions on Neural Networks, Nov. 13, 2006, 17(6):1452-9.
Lutgehetmann et al., "Computing Persistent Homology of Directed Flag Complexes," Algorithms, Jan. 7, 2020, 1:1-18.
Lynn et al., "The physics of brain network structure, function, and control," Nature Reviews, May 27, 2019, 1:318-332.
Mardones, "Persistence Steenrod modules," ArXiv Mathematics, Dec. 12, 2018, pp. 1-10.
Maria, "Algorithms and data structures in computational topology" (Doctoral dissertation, Université Nice Sophia Antipolis), Oct. 28, 2014, 205 pages.
Markram et al., "Reconstruction and simulation of neocortical microcircuitry," Cell, Oct. 8, 2015, 163:456-492.
Masulli et al., "Dynamics of evolving feed-forward neural networks and their topological invariants," Network and Parallel Computing, Aug. 13, 2016, pp. 99-106.
Masulli et al., "The topology of the directed clique complex as a network invariant," SpringerPlus, Dec. 2016, 5(1):1-2.
mathworld.wolfram.com [online], "Adjacency Matrix," 2016, retrieved via Internet Archive on Apr. 8, 2022, retrieved from <https://web.archive.org/web/20160311204902/https://mathworld.wolfram.com/AdjacencyMatrix.html>, 2 pages.

(56) References Cited

OTHER PUBLICATIONS

McCoss, Agency of Life, Entropic Gravity and Phenomena Attributed to "Dark Matter," Journal of Quantum Information Science, Jun. 15, 2017, 7:67-75.
McCoss, "Lithium Quantum Consciousness," Journal of Quantum Information Science, Nov. 8, 2017, 7:125-139.
Mehta, "Storing and retrieving long-term memories: cooperation and competition in synaptic dynamics," Advances in Physics: X, Jul. 19, 2018, 3:756-790.
Meyer et al, "Cell type-specific thalamic innervation in a column of rat vibrissal cortex," Cereb. Cortex, Jun. 9, 2010, 20: 2287-2303.
Millán et al., "Complex Network Geometry and Frustrated Synchronization," Scientific Reports, Jul. 2, 2018, 8:1-10.
Millan Vidal et al., "Synchronization in network geometries with finite spectral dimension," ArXiv, Jan. 31, 2019, pp. 1-15.
Miller et al., "Visual stimuli recruit intrinsically generated cortical ensembles," Proc. Natl. Acad. Sci. U.S.A., Sep. 8, 2014, pp. E4053-E4061.
Milo et al., "Network Motifs: Simple Building Blocks of Complex Networks," *Science*, Oct. 25, 2002, 298(5594):824-827.
Minkovich et al. "Programming time-multiplexed reconfigurable hardware using a scalable neuromorphic compiler," IEEE transactions on neural networks and learning systems, Apr. 11, 2012, 23(6):889-901.
Miura et al., "Sparse Parallel Algorithms for Recognizing Touch Topology on Curved Interactive Screens," IEEE Access, Jul. 31, 2017, 5:14889-14897.
Muller et al., "Neocortical plasticity: an unsupervised cake but no free lunch," 33rd Conference on Neural Information Processing Systems, Vancouver, Canada, Nov. 2019, 6 pages.
Munkres, "Elements of Algebraic Topology," Massachusetts Institute of Technology, 1984, Addison-Wesley Publishing Company, 233 pages.
Nolte, "Cortical reliability amid noise and chaos," Nature Communications, Aug. 22, 2019, 10:1-15.
Norton, "Dynamics of Reaction-Diffusion Oscillators in Star and other Networks with Cyclic Symmetries Exhibiting Multiple Clusters," Physical Review Letters, Oct. 4, 2019, 123: 1-6.
Office Action in Korean Appln. No. 2020/7035845, dated Feb. 16, 2022, 9 pages (with English translation).
Office Action in Korean Appln. No. 2020-7035843, dated Jan. 27, 2022, 9 pages (with English translation).
Office Action in Korean Appln. No. 2020-7035844, dated Feb. 17, 2022, 6 pages (with English translation).
Office Action in Korean Appln. No. 2020-7035846, dated Feb. 15, 2022, 6 pages (with English translation).
Office Action in Korean Appln. No. 2020-7035847, dated Aug. 10, 2022, 5 pages (with English translation).
Office Action in Korean Appln. No. 2020-7035847, dated Feb. 15, 2022, 11 pages (with English translation).
Office Action in Taiwanese Appln. No. 108119813, dated Jun. 29, 2020, 17 pages (with machine translation).
Office Action in Taiwanese Appln. No. 108119813, dated May 19, 2021, 8 pages (with machine translation).
Office Action in Taiwanese Appln. No. 109143238, dated Dec. 1, 2021, 18 pages (with machine translation).
Office Action in Taiwanese Appln. No. 109143239, dated Nov. 30, 2021, 22 pages (with machine translation).
Office Action in Taiwanese Appln. No. 109143240, dated Dec. 24, 2021, 13 pages (with machine translation).
Office Action in Taiwanese Appln. No. 109143242, dated Nov. 26, 2021, 24 pages (with machine translation).
Office Action in Taiwanese Appln. No. 109143863, dated Mar. 1, 2022, 11 pages (with machine translation).
Office Action in Taiwanese Appln. No. 10943863, dated Mar. 1, 2022, 13 pages (with machine translation).
Office Action in U.S. Appl. No. 15/864,146, dated Dec. 8, 2021, 73 pages.
Office Action in U.S. Appl. No. 15/864,146, dated Jan. 13, 2021, 37 pages.
Office Action in U.S. Appl. No. 15/864,146, dated Jun. 3, 2021, 55 pages.
Office Action in U.S. Appl. No. 16/004,635, dated Aug. 3, 2022, 24 pages.
Office Action in U.S. Appl. No. 16/004,635, dated Jun. 3, 2021, 44 pages.
Office Action in U.S. Appl. No. 16/004,635, dated Nov. 24, 2021, 34 pages.
Office Action in U.S. Appl. No. 16/004,671, dated May 26, 2022, 43 pages.
Office Action in U.S. Appl. No. 16/004,671, dated Nov. 17, 2021, 40 pages.
Office Action in U.S. Appl. No. 16/004,757, dated Dec. 20, 2021, 31 pages.
Office Action in U.S. Appl. No. 16/004,757, dated Jul. 14, 2022, 30 pages.
Office Action in U.S. Appl. No. 16/004,757, dated Jun. 8, 2021, 26 pages.
Office Action in U.S. Appl. No. 16/004,796, dated Apr. 8, 2021, 35 pages.
Office Action in U.S. Appl. No. 16/004,796, dated Aug. 4, 2022, 45 pages.
Office Action in U.S. Appl. No. 16/004,796, dated Sep. 16, 2021, 46 pages.
Office Action in U.S. Appl. No. 16/004,837, dated Jun. 6, 2022, 8 pages.
Office Action in U.S. Appl. No. 16/356,391, dated Mar. 8, 2022, 10 pages.
Office Action in U.S. Appl. No. 16/356,391, dated Nov. 9, 2021, 13 pages.
Office Action in U.S. Appl. No. 16/356,478, dated Mar. 3, 2022, 5 pages.
Office Action in U.S. Appl. No. 16/710,058, dated Sep. 9, 2022, 14 pages.
Office Action in U.S. Appl. No. 16/710,176, dated Jun. 9, 2022, 7 pages.
Opris et al., "What Is the Evidence for Inter-laminar Integration in a Prefrontal Cortical Minicolumn?," Frontiers in Neuroanatomy, Dec. 14, 2017, 11: 1-11.
Pajevic et al., "The organization of strong links in complex networks," Nat. Phys., Mar. 11, 2012, 8:429-436.
Palm et al., "On the significance of correlations among neuronal spike trains," Biol. Cybern., Jun. 1, 1988, 59:1-11.
Panda et al., "Learning to Recognize Actions from Limited Training Examples Using a Recurrent Spiking Neural Model", arXiv, Oct. 19, 2017, 17 pages.
Paredes-Valles et al., "Unsupervised Learning of a Hierarchical Spiking Neural Network for Optical Flow Estimation: From Events to Global Motion Perception," IEEE Transactions on Pattern Analysis and Machine Intelligence, Mar. 5, 2019, 42(8):2051-2064.
Park et al., "CNN (Convolutional Neural Network) based in-loop filter in HEVC," In Proceedings of the Korean Society of Broadcast Engineers Conference 2016, The Korean Institute of Broadcast and Media Engineers, 2016, pp. 369-372 (with English Abstract).
Patel et al., "Generative Design of Electromagnetic Structures Through Bayesian Learning," IEEE Transactions on Magnetics, Oct. 20, 2017, 54:1-4.
Paugam-Moisy et al, "Delay learning and polychronization for reservoir computing," Neurocomputing, Feb. 1, 2008, 71:1143-1158.
Pedregosa et al., "Scikit-learn: machine learning in Python," J. Mach. Learn. Res., Oct. 2010, 12:2825-2830.
Peng, "High-throughput microcircuit analysis of individual human brains through next-generation multineuron patch-clamp," BioRxiv, Jan. 1, 2019, pp. 1-49.
Perin et al., "A synaptic organizing principle for cortical neuronal groups," Proc. Natl. Acad. Sci. U.S.A., Mar. 29, 2011, 108:5419-5424.
Peters et al., "The projection of the lateral geniculate nucleus to area 17 of the rat cerebral cortex. I General description.," J. Neurocytol., Feb. 1976, 5:63-84.

(56) References Cited

OTHER PUBLICATIONS

Peters et al., "The projection of the lateral geniculate nucleus to area 17 of the rat cerebral cortex. V. Degenerating axon terminals synapsing with Golgi impregnated neurons," *J Neurocytol.*, 1979, 8:331-357.
Petlevski, "Modeling the Model: the World Beyond the Immediate Sensorium," Proceedings of the 20th International Multiconference Information Society, Oct. 18, 2017, pp. 44-47.
Petri et al., "Homological scaffolds of brain functional networks," J. R. Soc. Interface, Dec. 6, 2014, 1:1-11.
Petri et al., "Simplicial Activity Driven Model," Phys. Rev. Lett., Nov. 29, 2018, 121:1-5.
Planas et al., "Accelerating Data Analysis in Simulation Neuroscience with Big Data Technologies," International Conference on Computational Science, Jun. 1, 2018, pp. 363-377.
Popa, "Psychology 2.0: The Emergence of Individuality," Sep. 2019, pp. 1-6.
Prentner, "Consciousness and Topologically Structured Phenomenal Spaces," Consciousness and Cognition, Feb. 26, 2019, 70:25-38.
Ramaswamy et al., "The neocortical microcircuit collaboration portal: a resource for rat somatosensory cortex," Front. Neural Circuits, Oct. 8, 2015, 9:1-14.
Rawal et al., "From nodes to networks: Evolving recurrent neural networks," arXiv preprint arXiv:1803.04439, Mar. 12, 2018, 8 pages.
Reimann et al, "Cliques of Neurons Bound into Cavities Provide a Missing Link between Structure and Function," Frontiers in Computational Neuroscience, Jun. 12, 2017, 11:1-16.
Reimann et al. "An algorithm to predict the connectome of neural microcircuits," Front. Comput. Neurosci., Oct. 8, 2015, 9:1-18.
Renart et al., "The asynchronous state in cortical circuits," Science 327, Jan. 29, 2010, 587-590.
Rosenbaum et al., "The spatial structure of correlated neuronal variability," Nat. Neurosci., Oct. 21, 2016, 20:107-114.
Salnikov, et al., "Simplicial complexes and complex systems," European Journal of Physics, Nov. 14, 2018, 40(1):014001.
Santos et al., "Topological phase transitions in functional brain networks," Physical Review E, Sep. 30, 2019, 100: 1-17.
Saucan et al., "Forman's Ricci Curvature—From Networks to Hypernetworks," vol. 1, Proceedings The 7th International Conference on Complex Networks and Their Applications, ArXiv, Oct. 17, 2018, 13 pages.
Schoenberg et al., "Mapping Meditative States and Stages with Electrophysiology: Concepts, Classifications, and Methods," Current Opinion in Psychology, Oct. 18, 2018, 28:211-217.
SciPy.org [online], "SciPy: Open Source Scientific Tools for Python," available on or before Mar. 9, 2001, via Internet Achieve: Wayback Machine URL <https://web.archive.org/web/20010309040805/http://www.scipy.org/>, retrieved on Jan. 17, 2020, <https://www.scipy.org/citing.html>.
See et al., "Coordinated neuronal ensembles in primary auditory cortical columns," Elife Sciences, Jun. 5, 2018, pp. 1-33.
Shepherd et al., "Geometric and functional organization of cortical circuits," Nat. Neurosci., May 8, 2005, 8:782-790.
Sizemore et al., "The importance of the whole: Topological data analysis for the network neuroscientist," Network Neuroscience, Oct. 17, 2018, 3:1-18.
Sizemore et al., "Cliques and cavities in the human connectome," Journal of computational neuroscience, Feb. 2018, 44(1):115-45.
Skardal et al., "Abrupt Desynchronization and Extensive Multistability in Globally Coupled Oscillator Simplexes," Physical Review Letters 122, Jun. 19, 2019, pp. 1-6.
Song et al. "Highly nonrandom features of synaptic connectivity in local cortical circuits," PLoS Biol., Mar. 1, 2005, 3:0507-0519.
Srivastava et al., "Dropout: a simple way to prevent neural networks from overfitting," The journal of machine learning research, Jan. 2014, 15(1):1929-58.
Stepanyants et al., "Neurogeometry and potential synaptic connectivity," Trends in Neurosci., Jun. 2, 2005, 28:387-394.
Suarez, "The interaction between task goals and the representation of choice options in decision-making," Thesis for the degree of Doctor of Philosophy, University College of London, Sep. 2017, pp. 1-176.
Sun et al., "Runtime detection of activated polychromous neuronal group towards its spatiotemporal analysis," 2015 International Joint Conference on Neural Networks, Jul. 12-17, 2015, 1-8.
Timsit et al., "Nervous-Like Circuits in the Ribosome Facts, Hypotheses and Perspectives," Int. J. Mol. Sci, Jun. 14, 2019, 20:1-22.
Tozzi et al., Brain Projective Reality: Novel Clothes for the Emperor, Reply to comments of "Topodynamics of metastable brains," Physics of Life Reviews, Jun. 28, 2017, pp. 1-11.
Turner, "Rips filtrations for quasimetric spaces and asymmetric functions with stability results," Algebraic & Geometric Topology, May 21, 2019, 19:1135-1170.
Tyukin et al., "High-Dimensional Brain: A Tool for Encoding and Rapid Learning of Memories by Single Neurons," Bull Math Biol., Mar. 19, 2018, 11:4856-4888.
Varshney et al., "Structural properties of the caenorhabditis elegans neuronal network," PLoS Comput. Biol., Feb. 3, 2011, 7:1-22.
Velazquez et al., "On a Simple General Principle of Brain Organization," Frontiers in Neuroscience, Oct. 15, 2019, 13:1-16.
Wang et al., "Topological recurrent neural network for diffusion prediction," In2017 IEEE International Conference on Data Mining (ICDM), Nov. 18, 2017, pp. 475-484.
Wijaya et al., "Finding an appropriate equation to measure similarity between binary vectors: case studies on Indonesian and Japanese herbal medicines," BMC bioinformatics, Dec. 2016,17:1-19.
wikipedia.org [online], "DBSCAN," Mar. 31, 2008, retrieved on Oct. 5, 2022, retrieved from URL <https://en.wikipedia.org/wiki/DBSCAN>, 8 pages.
wikipedia.org [online], "Harris corner detector," Apr. 21, 2019, retrieved on Oct. 5, 2022, retrieved on Oct. 5, 2022, retrieved from URL <https://en.wikipedia.org/wiki/Harris_corner_detector>, 6 pages.
wikipedia.org [online], "OPTICS algorithm," Jun. 12, 2010, retrieved Oct. 5, 2022, retrieved from URL <https://en.wikipedia.org/wiki/OPTICS_algorithm>, 6 pages.
wikipedia.org [online], "Scale-invariant feature transform," Apr. 15, 2005, retrieved on Oct. 5, 2022, retrieved from URL <https://en.wikipedia.org/wiki/Scale-invariant_feature_transform>, 19 pages.
Willshaw et al., "Nonholographic associative memory," Nature 222, Jun. 7, 1969, pp. 960-963.
Woodward et al., "A Reservoir Computing approach to Image Classification using Coupled Echo State and Back-Propagation Neural Networks," International conference image and vision computing, Auckland, New Zealand, Nov. 29, 2011, 6 pages.
Yang et al., "Convolutional Neural Networks with Alternately Updated Clique," 2018 IEEE/CVF Conference on Computer Vision and Pattern Recognition, 2018, pp. 2413-2422.
Yang et al., "Road detection and centerline extraction via deep recurrent convolutional neural network U-Net," IEEE Transactions on Geoscience and Remote Sensing, May 14, 2019, 57(9):7209-20.
Young, "Standard Laterality Models: Neo-Eriksonian Perspectives," Chapter 8, Causality and Development, Jan. 2019, pp. 147-179.
Ghosh et al., "Design and Construction of a Brain-like computer: A New class of Frequency-Fractal Computing Using Wireless Communication in a Supramolecular Organic, Inorganic System," Information, 2014, 5, 28-100.
International Search Report and Written Opinion in International Appln. No. PCT/EP2020/085716, mailed on Mar. 25, 2021, 14 pages.
Masulli et al., "Algebro-topological invariants in network theory," Int. J. Complex Systems in Science, Sep. 2015, 5(1):13-17.
Office Action in U.S. Appl. No. 16/004,671, dated Jun. 28, 2023, 39 pages.
Office Action in U.S. Appl. No. 16/004,757, dated Mar. 29, 2023, 36 pages.
Office Action in U.S. Appl. No. 16/004,796, dated Feb. 23, 2023, 31 pages.
Office Action in U.S. Appl. No. 16/710,205, dated May 10, 2023, 37 pages.

(56) References Cited

OTHER PUBLICATIONS

Office Action in U.S. Appl. No. 16/710,266, dated Apr. 12, 2023, 41 pages.
U.S. Appl. No. 18/167,958, filed Feb. 13, 2023, Markram.
International Preliminary Report on Patentability in International Appln. No. PCT/EP2022/073852, mailed on Mar. 28, 2024, 12 pages.
Office Action in Chinese Appln. No. 202080035412.2, mailed on Jan. 30, 2024, 22 pages (with English translation).
Office Action in U.S. Appl. No. 16/710,266, dated Jan. 29, 2024, 35 pages.
Office Action in U.S. Appl. No. 18/167,958, dated Feb. 15, 2024, 7 pages.
U.S. Appl. No. 17/454,347, filed Nov. 10, 2021, Lütgehetmann.
Office Action in U.S. Appl. No. 16/004,635, dated Jan. 23, 2023, 24 pages.
Mur-Artal et al., "ORB-SLAM: a Versatile and Accurate Monocular SLAM System," IEEE transactions on robotics, Oct. 5, 2015, 31(5):1147-63.
Mur-Artal et al., "ORB-SLAM2: An Open-Source SLAM system for Monocular, Stereo, and RGB-D Cameras," CoRR, Submitted on Jun. 19, 2017, arXiv:1610.06475, 9 pages.
Office Action in Chinese Appln. No. 201980053140.6, mailed on Apr. 29, 2024, 15 pages (with English translation).
Office Action in Chinese Appln. No. 201980053141.0, mailed on Apr. 30, 2024, 19 pages (with English translation).
Office Action in Chinese Appln. No. 201980053463.5, mailed on May 23, 2024, 7 pages (with English translation).
Office Action in Chinese Appln. No. 201980053465.4, mailed on May 23, 2024, 7 pages (with English translation).
Office Action in Chinese Appln. No. 201980054063.6, mailed on May 23, 2024, 7 pages (with English translation).
Office Action in U.S. Appl. No. 16/004,796, mailed on May 10, 2024, 40 pages.
U.S. Appl. No. 18/527,555, filed Dec. 4, 2023, Markram.
U.S. Appl. No. 18/611,781, filed Mar. 21, 2024, Markram.
U.S. Appl. No. 18/490,927, filed Oct. 20, 2023, Markram et al.
U.S. Appl. No. 18/656,669, filed May 7, 2024, Markram.
Chatzis et al., "The copula echo state network," Pattern Recognition, Jan. 2012, 45(1):570-7.
Khan et al., "Learning from Privacy Preserved Encrypted Data on Cloud Through Supervised and Unsupervised Machine Learning," Presented at Proceedings of the 2019 2nd International Conference on Computing, Mathematics and Engineering Technologies, Sukkur, Sindh, Pakistan, Jan. 30-31, 2019, 5 pages.
Nazeran et al., "Neural Networks in Processing and Analysis of Biomedical Signals," Nonlinear Biomedical Signal Processing, Fuzzy Logic, Neural Networks, and New Algorithms, IEEE, Metin Akay (.ed), Jul. 2000, Chapter 4, pp. 69-97.
Office Action in Chinese Appln. No. 202080035412.2, mailed on Sep. 24, 2024, 9 pages (with Machine translation).
Office Action in European Appln. No. 20711136.0, mailed on Sep. 17, 2024, 8 pages.
Office Action in European Appln. No. 20711154.3, mailed on Sep. 13, 2024, 6 pages.
Office Action in U.S. Appl. No. 16/004,796, mailed on Sep. 24, 2024, 75 pages.
Office Action in U.S. Appl. No. 16/710,266, mailed on Aug. 9, 2024, 33 pages.
Timotheou, "The random neural network: a survey," The Computer Journal, Mar. 2010, 53(3):251-67.

\* cited by examiner

CHARACTERIZING AND IMPROVING OF IMAGE PROCESSING

TECHNICAL FIELD

This specification relates to image processing, more specifically, to characterizing and possibly improving pose estimates and other image processing results, including object counting, measurement of object deformation and/or arrangement, measurement of the state of objects, and others.

BACKGROUND

Image processing is a type of signal processing in which the processed signal is an image. An input image can be processed, e.g., to produce an output image or a characterization of the image.

One example of image processing is pose estimation. As discussed further below, pose estimation is a process whereby the relative positions and orientations of an imaging device and an object is estimated from a two-dimensional image. Pose estimates can be based on other results of image processing. One example is landmark recognition. In landmark recognition, two-dimensional images are processed to identify landmarks and their positions in the images. The identity and position of landmarks are examples of results on which pose estimates can be based.

SUMMARY

Characterization of a process is often a necessary precondition for control or improvement of the process. This is also true for image processing techniques, including those that rely upon machine learning and/or artificial intelligence.

For example, characterization of the correctness of pose estimates and other image processing on which pose estimates are based can be used to control or improve a variety of different types of image processing. As discussed above, poses can be estimated based on the results of landmark recognition. In such cases, characterizations of the correctness of pose estimates inherently embody the correctness of the underlying landmark recognition results.

Further, the results of landmark recognition can be used in other types of image processing, i.e., other than pose estimation. Examples include image classification, feature extraction, pattern recognition, and image processing techniques that rely upon machine learning and/or artificial intelligence techniques. Such image processing techniques can be applied in contexts as diverse as robotics, medical and medical imaging, self-driving vehicles, damage assessment, facial recognition, space travel, and agriculture. By characterizing the correctness of pose estimates and the underlying landmark recognition results, the correctness of other, varied types of image processing can also be characterized.

Accordingly, in one aspect, a method for characterizing correctness of image processing includes receiving a first image and a second image of an instance of an object, estimating a relative pose of the instance of the object in the first image, receiving information characterizing a difference in position or a difference in orientation of at least one of the instance of the object and one or more imaging devices during acquisition of the first image and acquisition of the second image, transferring the estimated relative pose of the instance of the object in the first image based on the difference in position or the difference in orientation, comparing the transferred relative pose of the instance of the object with the object in the second of the images, and characterizing a correctness of the estimation of the relative pose of the instance of the object based on a result of the comparison of the transferred relative pose of the object with the object in the second of the images. The first and second images were acquired at different relative poses.

In another aspect, a method for characterizing correctness of image processing includes receiving images of an instance of an object, wherein the images were acquired at different relative poses, identifying positions of corresponding landmarks on the object in each of the received images, receiving information characterizing a difference in position or a difference in orientation of at least one of the instance of the object and one or more imaging devices when the images were acquired, transferring the positions of landmarks identified in a first of the images based on the difference in position or the difference in orientation, and comparing the positions of the transferred landmarks with the positions of the corresponding of the landmarks identified in a second of the received images, and characterizing a correctness of the identification of the positions of the landmarks in at least one of the received images.

Both these and other aspects can include one or more of the following features. The method can include comparing the correctness of the estimation of the relative pose to a threshold level of correctness and, in response to determining that the correctness of the estimation of the relative pose does not satisfy the threshold level of correctness, instructing an agent that captures images of the instance of the object to capture an additional image of the object. The method can include instructing the agent to capture the additional image either at a different relative pose than the relative poses of the first image and the second image or with a different imaging characteristic than characteristics of the first image and the second image.

The method can include comparing the correctness of the estimation of the relative pose to a threshold level of correctness and, in response to determining that the correctness of the estimation of the relative pose does not satisfy the threshold level of correctness, excluding the estimated relative pose of the instance of the object in the first image from further image processing. The relative pose of the object can be transferred by receiving a three-dimensional model of the object and computing a characteristic of an image of the three-dimensional model acquired at the different position or the different orientation. Computing the characteristic of the image of the three-dimensional model can include computing a position of landmarks in the image of the three-dimensional model or computing an outer boundary of the image of the three-dimensional model. Computing the characteristic of the image of the three-dimensional model can include projecting the three-dimensional model based on the difference in position or the difference in orientation. The relative pose of the object in the first image can be estimated by detecting landmarks in the first image using a machine learning model and estimating the relative pose of the object using the detected landmarks.

The method can include iteratively repeating receiving images, estimating relative poses, receiving information characterizing differences in position or in orientation, transferring the estimated relative poses, and comparing the transferred relative poses. The iteratively repeating can proceed until a threshold level of correctness is reached.

The first image and the second image can be acquired by a same imaging device. The information characterizing the difference in position or the difference in orientation can be derived from the first image and the second image. Receiving the information characterizing the difference in position or the difference in orientation can include identifying either another object or a portion of the instance of the object in the images of the instance of the object, and determining the difference in position or the difference in orientation based on the other object or the portion of the instance of the object.

The positions of the corresponding landmarks can be identified by estimating relatives poses of the object and the one or more imaging devices. The information characterizing the difference in position or the difference in orientation can characterize a different of both of the object and the imaging device or devices. The correctness of the identification of the positions of the landmarks can be characterized by transferring the positions of landmarks identified in a second and a third of the images based on respective differences in position or differences in orientation and combining the transferred landmarks from the first, the second, and the third of the images.

Characterizing the correctness of the identification of the positions of the landmarks can include comparing the positions of the combined transferred landmarks with the positions of the corresponding of the landmarks identified in the second of the received images. Receiving the information characterizing the difference in position or the difference in orientation can include identifying either another object or a portion of the instance of the object in the images of the instance of the object and determining the difference in position or the difference in orientation based on the other object or the portion of the instance of the object. The positions of landmarks can be transferred by receiving a three-dimensional model of the object and projecting the three-dimensional model of the object to determine the positions of the landmarks.

The method can include comparing the correctness of the identification of the positions of the landmarks to a threshold level of correctness and, in response to determining that the correctness of the estimation of the relative pose does not satisfy the threshold level of correctness, receiving one of more additional images of the instance of the object and identifying positions of corresponding landmarks, receiving information characterizing the difference, transferring positions of the landmarks, comparing the positions of the transferred landmarks, and characterizing a correctness of the identification of the positions of the landmarks for the one of more additional images.

The method can include comparing the correctness of the identification of the positions of the landmarks to a threshold level of correctness and, in response to determining that the correctness of the estimation of the relative pose does not satisfy the threshold level of correctness, excluding the identification of the positions of the landmarks from further image processing.

Other implementations of the above-described methods include corresponding systems and apparatus configured to perform the actions of the methods, and computer programs that are tangibly embodied on machine-readable data storage devices and that configure data processing apparatus to perform the actions.

The details of one or more implementations are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
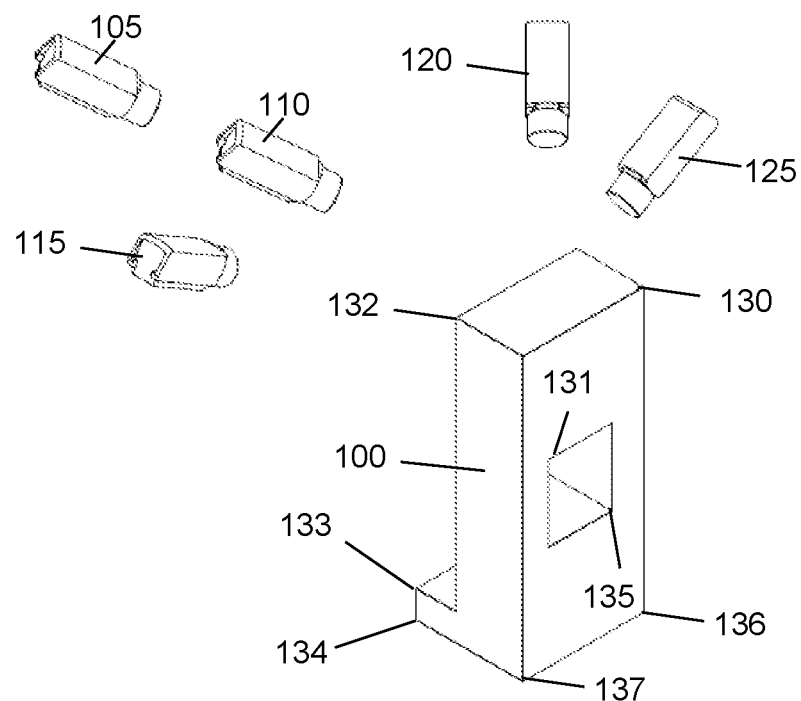
FIG. 1 is a schematic representation of the acquisition of a collection of different images of an object.

FIG. 1 is a schematic representation of the acquisition of a collection of different images of an object 100. For illustrative purposes, object 100 is shown as an assembly of ideal, unmarked geometric parts (e.g., cubes, polyhedrons, parallelepipeds, etc.). However, in real-world applications, objects will generally have a more complicated shape and be textured or otherwise marked, e.g., with ornamental decoration, wear marks, or other markings upon the underlying shape.

A collection of one or more imaging devices (here, illustrated as cameras 105, 110, 115, 120, 125) can be disposed successively or simultaneously at different relative positons around object 100 and oriented at different relative angles with respect to object 100. The positions can be distributed in 3-dimensional space around object 100. The orientations can also vary in 3-dimensions, i.e., the Euler angles (or yaw, pitch, and roll) can all vary. The relative positioning and orientation of a camera 105, 110, 115, 120, 125 with respect to object 100 can be referred to as the relative pose between the camera and the object. Since cameras 105, 110, 115, 120, 125 have different relative poses, cameras 105, 110, 115, 120, 125 will each acquire different images of object 100.

The relative pose between the camera and the object can be defined in different frames of reference. For example, a frame of reference for the relative pose of the camera and the object can be defined based solely the camera and the object, e.g., by drawing a straight line between a point on the object and a point on the camera and choosing a point along this line. The length of this line defines the distance between the object and the camera and the line can be used to define angular inclinations of the camera and the object. As another example, a frame of reference can be defined relative to other points of reference such as, e.g., a position on the ground or other location. Distances and orientations that are defined relative to these points can be converted to distances and orientations in a frame of reference that is defined based solely the camera and the object.

Returning to FIG. 2, even a simplified object like object 100 includes a number of landmarks 130, 131, 132, 133, 134, 135, 136, . . . . A landmark is a position of interest on object 100. Landmarks can be positioned at geometric locations on an object or at a marking upon the underlying geometric shape. As discussed further below, landmarks can be used for determining the pose of the object. Landmarks can also be used for other types of image processing, e.g., for classifying the object, for extracting features of the object, for locating other structures on the object (geometric structures or markings), for assessing damage to the object, and/or for serving as point of origin from which measurements can be made in these and other image processing techniques.

Figure 2:
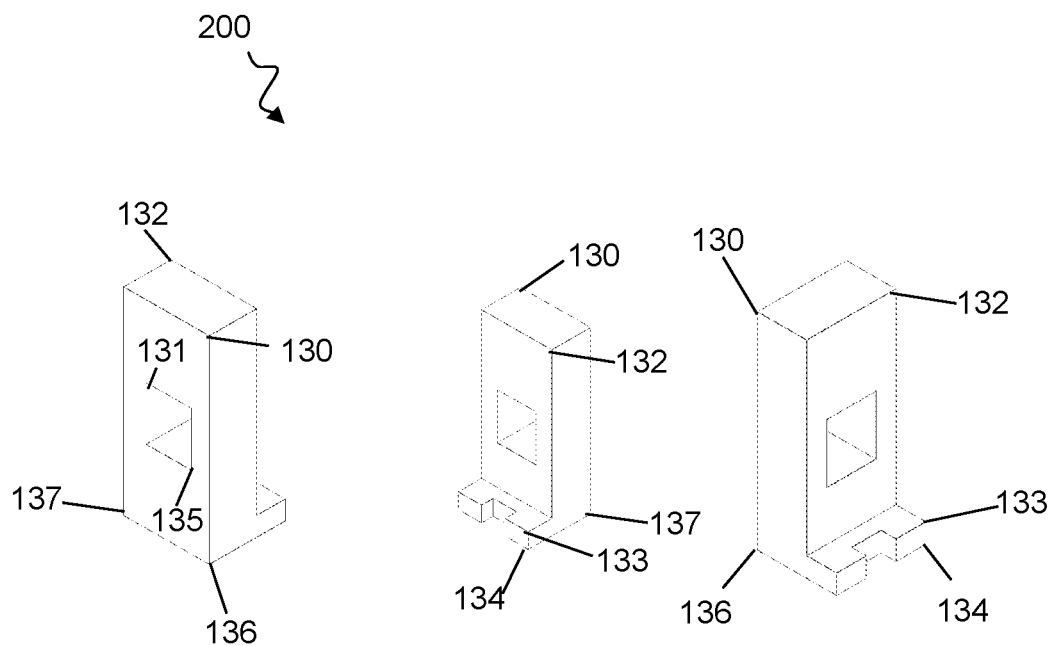
FIG. 2 is a schematic representation of a collection of two-dimensional images acquired by one or more cameras.

FIG. 2 is a schematic representation of a collection 200 of two-dimensional images acquired by one or more cameras, such as cameras 105, 110, 115, 120, 125 (FIG. 1). The images in collection 200 show object 100 at different relative poses. Landmarks like landmarks 130, 131, 132, 133, 134, 135, 136, . . . appear at different locations in different images—if they appear at all. For example, in the leftmost image in collection 200, landmarks 133, 134 are obscured by the remainder of object 100. In contrast, in the rightmost image 210, landmarks 131, 135, 137 are obscured by the remainder of object 100.

Figure 3:
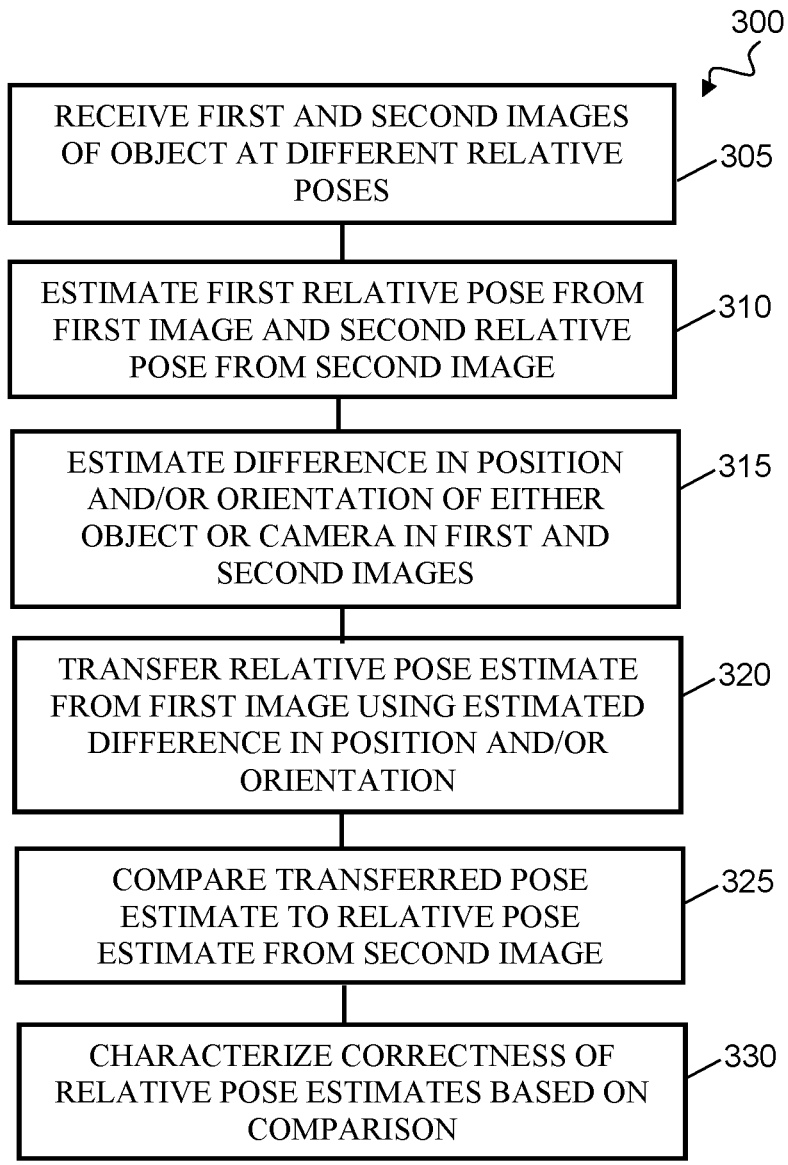
FIG. 3 is a flowchart of a computer-implemented process for characterizing the correctness of image processing.

FIG. 3 is a flowchart of a computer-implemented process 300 for characterizing the correctness of image processing, namely, pose estimates and the landmark recognition processes on which the pose estimates are based. Process 300 can be performed by one or more data processing devices that perform data processing activities. The activities of process 300 can be performed in accordance with the logic of a set of machine-readable instructions, a hardware assembly, or a combination of these and/or other instructions.

At 305, the device performing process 300 receives two or more images of an instance of a physical object of interest. The images were acquired at different relative poses between the object and the imaging device. Although the images could have been acquired by the same device that is performing process 300, in general, the device(s) that acquire the images will differ from the device that is implementing process 300. For example, the images can be acquired by one or more smart phones, cameras, medical imaging devices, LIDAR cameras, or the like. After acquisition, the images can be communicated to the device that is implementing process 300, e.g., using wired or wireless data communications, either as discrete images or as part of a video stream.

At 310, the device performing process 300 estimates the relative poses of the object of interest and the device that acquired the images using the received images themselves. For example, landmarks can be detected and then be used to estimate the pose of the object. An example machine learning model for landmark detection is the detectron2 available at https://github.com/facebookresearch/detectron2. An example of a pose estimator that relies upon landmark detection is OpenCV's functionality SolvePNP described at https://docs.opencv.org/master/d7/d53/tutorial_py_pose.html.

As another example, the relative poses can be estimated using process 1200 (FIG. 12) described below. This method uses a three-dimensional model of the object in estimating poses to identify landmarks in the received images. The landmarks can then be used to estimate the pose of the object. Further details including a process for making such a landmark detector are described, e.g., in FIGS. 13-15 and the associated text.

At 315, the device performing process 300 estimates a difference in position and/or orientation of at least one of the object or the imaging device in the first and second images using information other than the information used to estimate the relative poses at 310. The difference in position and/or orientation can be estimated using information drawn from external sources, from the first and second images themselves, or from both. The difference in position and/or orientation is generally not derived from information used to estimate the poses at step 310.

In more detail, as discussed above, the relative pose of an object and an imaging device depends on the positions and orientations of both the object and the imaging device. Thus, in an image that is acquired at a first relative pose, both the object and the imaging device have a respective position and orientation. If the position or the orientation (or both position and orientation) of either were to change, then the relative pose would also change.

However, rather than deriving the change(s) in position and/or orientation from the information used to estimate the relative poses between the object and the imaging device, at 315 the device performing process 300 estimates a difference in position and/or orientation of at least one—but not necessarily both—of the object or the imaging device in the different images using other information. In terms of a frame of reference that is defined relative to another point of reference (i.e., not defined solely by reference to the object and the imaging device), the device performing process 300 can estimate the change in position or orientation of at least one of the object or the imaging device—independently of the position or orientation of the other. In some implementations, the position and/or orientation of one of the object and the imaging device is assumed to remain unchanged.

As for how differences in position and/or orientation are estimated, the differences can be estimated from information drawn from a variety of different sources, including:
- external sources (i.e., sources other than the images themselves),
- the images themselves based on information that is present in the images but not used to estimate the pose of the object, or
- both information that is internal to the images and external to the images.

The precise nature of the information that is used to determine the differences in position and/or orientation of the object or the imaging device—and the way that the device performing process 300 receives this information—depends upon the application context.

For example, when the images were acquired by a single smart phone, camera, or other portable imaging device that is carried by a human, external information can include position information derived from, e.g., the global position system of the device or multilateration of cellular and/or WiFi signals sent from/received by the imaging device. The orientation can be derived from, e.g., an accelerometer, a gyroscope, and/or a magnetometer that is included in the imaging device. In such cases, the external information is received by the imaging device that is performing process 300 from the same device that acquired the images that are received at 305 and can be used to estimate the new pose. Further, the position and orientation of the imaged object can be assumed to remain unchanged in a frame of reference that is defined with respect to another (invariant) point.

An example scenario could be an individual who is taking pictures or video of a parked car using a smart phone. As the smart phone moves between images/frames, the phone's internal sensors can be used to estimate the changes in position and/or orientation of the phone between the images/frames. Further, position and orientation of the parked car relative to another frame of reference (e.g., a frame of reference defined with respect to a point on the ground) can be assumed to remain unchanged.

As another example, the images can be acquired by a camera or other imaging device that is mounted to another device. External information can include position and orientation information measured either by the mounting device itself or by sensors that monitor the mounting device and/or camera. One example is a camera that is mounted on a robotic arm or other device that translates and/or rotates. Such devices generally include internal sensors (e.g., encoders, accelerometers, gyroscopes, LVDT's) that participate in regulating translation and/or rotation and that can provide external information that is suitable for transferring pose estimates. Even if the information is not derived from internal sensors of the device to which the camera is mounted, other sensors directed at the mounting device (e.g., multi-camera visual systems that estimate the pose of the mounting device) can be used to transfer pose estimates. In such cases, the external information is received by the device that is performing process 300 either from the device on which the camera is mounted or from a sensor that is directed at the mounting device and used to estimate the new pose.

An example scenario could be a camera that is fixedly mounted to an end effector of a robotic arm. As the arm moves, position information can be collected by the internal sensors of the robotic arm and used to regulate the position of the arm. This information can also be used to estimate the changes in position and/or orientation of the camera between images/frames. If the robotic arm is operating on a stationary workpiece, the position and orientation of the workpiece relative to another frame of reference can be assumed to remain unchanged. On the other hand, if the workpiece moves between images/frames (e.g., on a conveyor belt or work slide), the device performing process 300 can estimate a difference in position and/or orientation of both the workpiece and the camera in the different images/frames.

Another example scenario could be a camera that is fixedly mounted to a vehicle such as, e.g., a drone or automobile. As the vehicle moves, position information can be collected by the internal sensors of the vehicle. This information can also be used to estimate the changes in position and/or orientation of the camera between images/frames. If the camera is imaging a stationary object, the position and orientation of the object relative to another frame of reference can be assumed to remain unchanged. On the other hand, if the object also moves between images/frames (e.g., the object is another vehicle that is also moving), the device performing process 300 can receive position information from internal sensors of the other object and estimate a difference in position and/or orientation of both the object and the camera in the different images/frames.

As yet another example, cameras can be used in dental imaging. For example, in some implementations, a camera can be moved relative to the object(s) (e.g., teeth) being imaged. For example, a dental practitioner or an individual in a self-care situation can move a camera within an individual's/its own mouth manually. In some implementations, the camera can be held stationary and different images having different characteristics can be acquired from the same position. For example, images can be acquired with different focuses, different imaging filters, and different light sources. Examples include different polarized light sources and filters, different wave length sources and filters, different intensity sources and filters, and the like. In some implementations, both the relative position of the camera and objects and characteristics of the imaging itself can be changed. Further, it is not necessary that multiple images with different characteristics be acquired at the same relative position of position of the camera and the object(s) being imaged. For example, during a first pass in which the camera is moved within the mouth, images having a first set of characteristics can be acquired. During a second pass, images having a second, different set of characteristics can be acquired.

As yet another example, the images can be acquired by a stationary camera that images an object that is moving. One example scenario could be a camera that images objects carried along an assembly line or by a conveyor belt. External information can be derived from the operational parameters and/or sensors of or directed at the carrier. For example, sensors can measure the speed of a conveyor belt or work slide. In such cases, the external information is received by the device that is performing process 300 either from the carrier or from a sensor that is directed at the carrier. Further, in some implementations, the position and orientation of the stationary camera relative to another frame of reference can be assumed to remain unchanged.

As yet another example, the images can be acquired by multiple cameras that have a known spatial and orientational relationship but image the same object, e.g., at the same time. The external information can characterize the spatial and orientational relationship. In such cases, the external information need not be received by the device that is performing process 300 in every iteration of process 300. Rather, the spatial and orientational relationship of the cameras can be maintained constant. Further, in some implementations—including those in which multiple images are acquired simultaneously, the position and orientation of the object relative to another frame of reference can be assumed to remain unchanged.

As yet another example, internal information can be derived from the images themselves. For example, as discussed further below, landmarks that are not part of the object of interest can be used to estimate the position and orientation of a camera in the second image. As another example, landmarks that are part of the object of interest but not used to estimate the poses at 310 can be used to estimate the position and orientation of a camera in the second image. Nevertheless, such estimates of the position and orientation of a camera in the second image can be used to estimate differences in position and/or orientation in different images. The internal information is included in the images received at 305 and received by the device that is performing process 300 at 305.

At 320, the device performing process 300 transfers the first relative pose estimate from a first of the images using the difference in position and/or orientation estimated at 315. The transfer can be done in a number of different ways. For example, the transfer can include affine transformation of the first relative pose dependent on the difference in position and/or orientation. As another example, a neural network that has been trained on image pairs with relative or absolute poses can be used to transfer the first relative pose. As yet another example, visual odometry methods can be used to transfer the first relative pose. In instances in which a three-dimensional model of the object is available, the device performing process 300 can assume that the first relative pose estimate is correct and then project the three-dimensional model to compute how the object would appear had the position and/or orientation of one or both of the object and imaging device changed as estimated at 315.

At 325, the device performing process 300 compares the transferred first relative pose from 320 with the second relative pose estimate estimated from the second image from 310. The comparison can be made in a number of different ways and can indicate the correctness of the relative pose estimates.

For example, in implementations of process 300 that rely upon landmark detection, the position of the landmarks in the second image can be compared with the calculated position of the same landmarks in a hypothetical image formed by transferring the first relative pose. In cases in which the transfer at 320 relies upon a three-dimensional model of the object, these differences in the positions of the landmarks indicate errors in landmark detection from the original images (from 310) and/or in the estimated positional differences from 315. If the error in the estimated positional differences is small enough (e.g., when the images were acquired in a scenario with very accurate position and orientation information), then the differences in the positions of the landmarks can be attributed to errors in the landmark detection process that underlies the relative pose estimates at 310. The correctness of the image processing for landmark detection can be characterized.

Please note that although the present specification refers to a three-dimensional model of "the object," the three-dimensional models are generally not a model of a single physical instance of an object. Rather, the three-dimensional models are generally a generic and idealized model of different objects that share common characteristics. Examples include three-dimensional models of cars or appliances of a certain make and model—without considering details of particulars instances of the cars or appliances. Other examples include three-dimensional models of animal taxonomic groups (e.g., instances of a species or of a gender of a species) and three-dimensional models of organs. However, in some implementations, the three-dimensional model is a model of a single physical instance of an object. For example, three-dimensional models can be formed by three-dimensional scanning of individual instance of real objects (e.g., using a laser scanner, a lidar device or the like).

Returning to 325, as another example, in other implementations and as discussed further below, pose estimates can be compared by comparing an outer boundary of an object that has transferred from a first relative pose from 320 with the outer boundary of the same object at the second relative pose estimate estimated from 310. Once again, the can indicate the correctness of the relative pose estimates.

In some implementations, the comparisons can also be used to identify the particular reason why the relative pose estimates differ. For example, systematic errors can be identified if the differences in the position of landmarks are consistent in magnitude and direction. As another example, the precision of measurements can be characterized as process 300 is performed multiple times on multiple different images and, e.g., the results from different iterations are averaged. Indeed, in some implementations, multiple iterations of process 300 can be used to determine a standard error of the image processing.

As yet another example, as discussed further below, outlier landmarks that consistently display relatively large differences in position—notwithstanding other landmarks displaying much smaller differences in position—can be detected. In some implementations, the cause of the deviation of outlier landmarks from expectations can be attributed to real-world circumstances that are particular to the image processing scenario. Examples of such circumstances include, e.g., local damage to or deformation of the object being images, local manufacturing defects, or other circumstances that result in discrepancies in the positions of some—but not all—of the landmarks.

Figure 4:
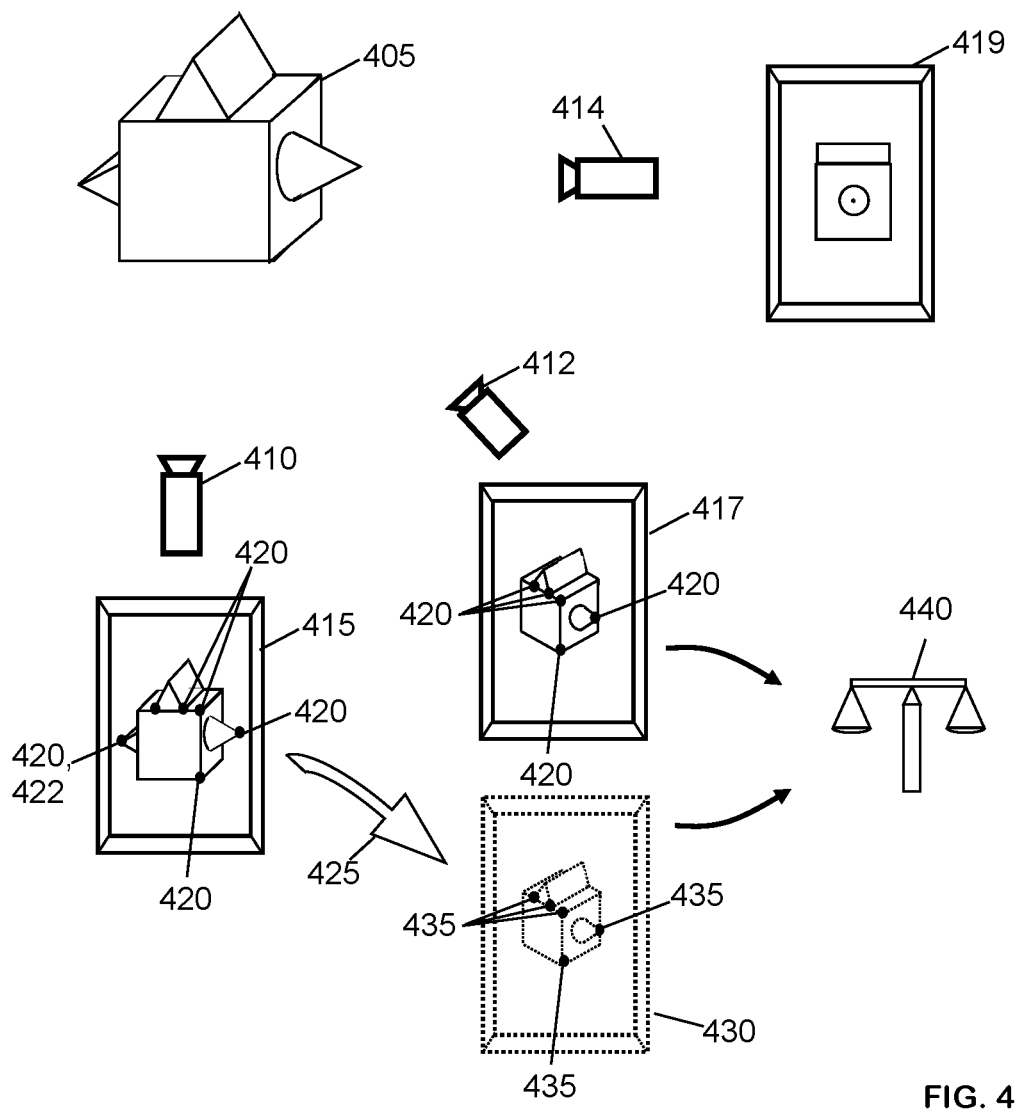
FIG. 4 is a schematic representation of one implementation of the process of FIG. 3.

FIG. 4 is a schematic representation of one implementation of process 300. In the illustrated implementation, an object 405 is imaged by one or more cameras that are disposed successively or simultaneously at different positions and/or orientations 410, 412, 414 around a stationary object 405. The imaging yields images 415, 417, 419. Only two of images 415, 417, 419 need be provided and used during a single iteration of process 300. However, as discussed further below, three or more images can also be provided and multiple iterations of process 300 can be performed.

In the first iteration, landmarks 420 are identified in each of images 415, 417. Landmarks 420 can be used to estimate the relative pose of object 405 and the imaging device in each image 415, 417 (i.e., 310, FIG. 3). In the illustrated implementation, most—but not all—of landmarks 420 are common to images 415, 417. One exception is landmark 420, 422—which is visible in image 415 but obscured by other portions of object 405 in image 417 (and image 419). In other implementations, other landmarks will be visible in some images and obscured in others.

Further, the differences between positions and/or orientations 410, 412 can be estimated from information other than relative pose estimates For example, information that is external to 415, 417, internal to images 415, 417, or both can be used. These differences can be used to transfer one of images 415, 417 to another of images 415, 417. Since object 405 is stationary in the illustrated implementation, the transfer need only consider differences in the positions and/or orientations 410, 412 of the imaging device(s). However, in other implementations, differences in the positions and/or orientations of object 405 can also be considered during transfer.

In the illustrated implementation, the transfer of image 415 (i.e., 320 in process 300) is represented for illustrative purposes by an arrow 425 and a hypothetical new image 430 of object 405. In general, a complete new image 430 of the object 405 is not actually generated or rendered. Rather, the transfer need only derive positions of various landmarks 435 in a hypothetical new image that would result given the differences between positions and/or orientations 410, 412, for example, by projecting a three-dimensional model of the object based on the differences. At least some of the landmarks 420 in image 417 have corresponding landmarks 435.

In the illustrated implementation, the position of the landmarks 420 in image 417 and corresponding landmarks 435 are compared. This comparison is schematically represented as a scale 440, but can be implemented, e.g., by determining a difference in x and y coordinates of the corresponding landmarks 420, 435.

Figure 5:
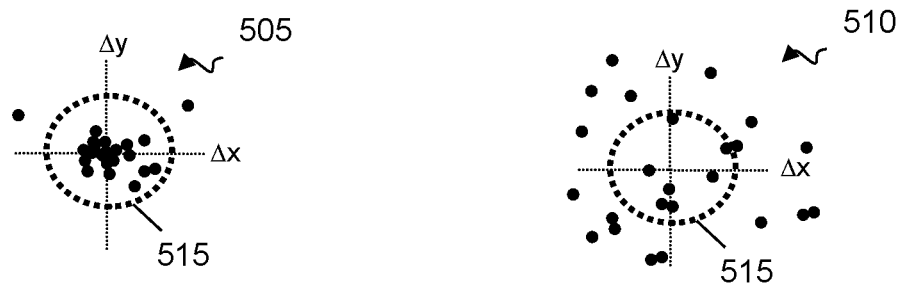
FIG. 5 schematically represents different results of comparisons of landmark positions.

FIG. 5 schematically represents different results 505, 510 of two arbitrary comparisons of landmark positions (i.e., not related to FIG. 4). Each dot in results 505, 510 is positioned in a Cartesian graph to represent the x coordinate difference Δx and the y coordinate difference Δy between the position of a respective landmark that is detected in one image and the position of the corresponding landmark as transferred from another image. As discussed above, the transfer is based on either external or internal information that characterizes a difference in position and/or orientation of the object and/or the imaging device in the two images. As shown, results 505 are more tightly clustered than results 510, indicating that the image processing that yielded results 505 is more correct than the image processing that yielded results 510.

Each result 505, 510 also schematically represents a threshold 515 that indicates an acceptable amount of deviation in the position. For example, in result 505, many of the differences in position are within the threshold, whereas many of the differences in position are outside the threshold in result 515.

Figure 6:
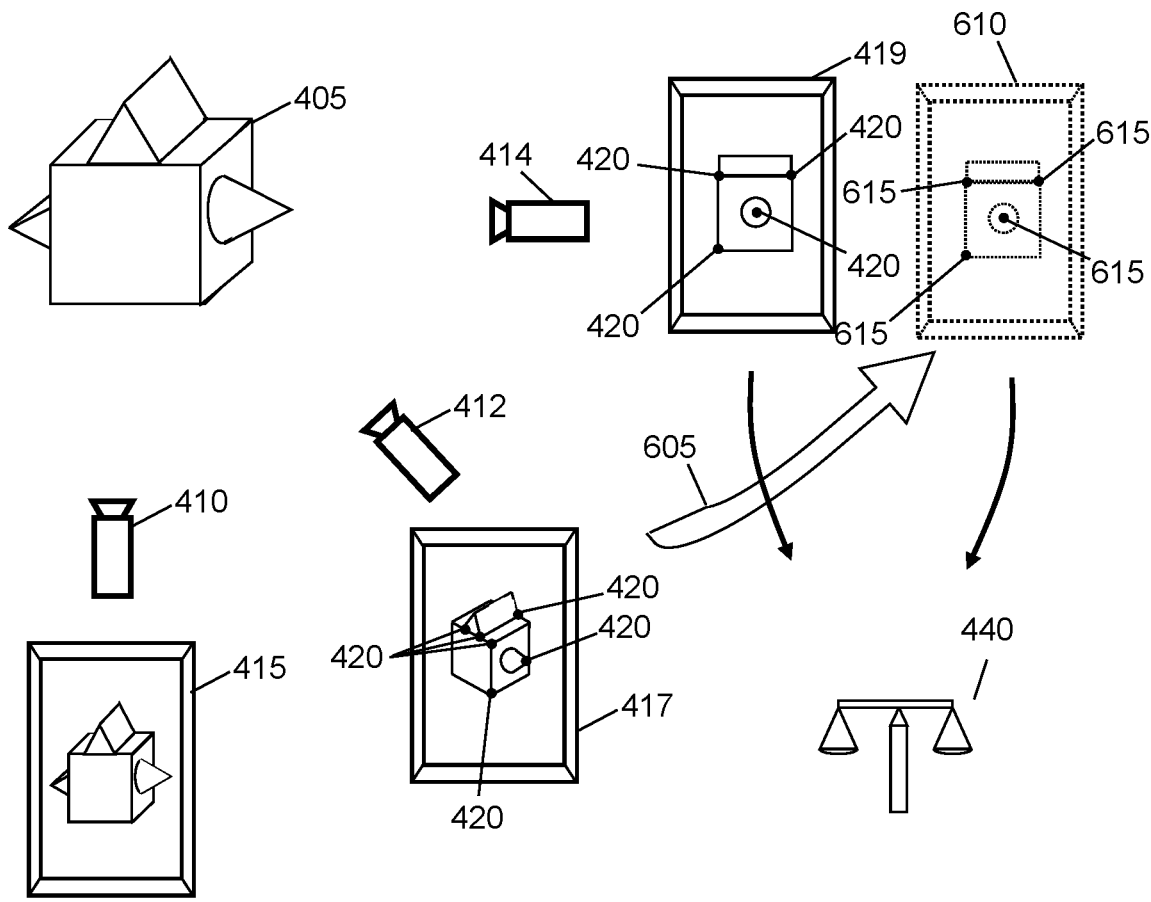
FIG. 6 is a schematic representation of a second iteration of the process of FIG. 3.

FIG. 6 is a schematic representation of a second iteration of process 300. The illustrated second iteration can be performed in conjunction with the first iteration represented in FIG. 4. In this second iteration, landmarks 420 are identified in each of images 417, 419. In many cases, some of the same landmarks identified in image 417 in the first iteration can be reused. The landmarks 420 can be used to estimate the relative pose of object 405 and the imaging device in each image 417, 419. The differences between positions and/or orientations 412, 414 can be estimated using other information. These differences can be used to transfer one of images 417, 419 to another of images 417, 419, as schematically represented by an arrow 605 and a hypothetical new image 610. At least some of the landmarks 420 in image 419 have corresponding landmarks 615. Once again, the positions of the landmarks 420 in image 419 and corresponding landmarks 615 are compared, as schematically represented by scale 440.

In some implementations, the positions of landmarks can be compared across multiple iterations of process 300 to characterize the results of image processing. Further, the comparisons need not be expressed as a direct comparison of the x, y positions of individual landmarks detected in an image and a corresponding landmark transferred from another image. Rather, comparisons can be express positional differences of groups or subgroups of landmarks. For example, regional groupings of landmarks can be defined and compared to characterize the correctness of pose estimation locally, i.e., region by region. For example, a close match of the landmarks at a bottom region of an object may indicate that the pose estimates are more correct in this region and poor matches at another region may indicate that the pose estimates are less correct in this other region.

Further, the positional differences can reflect differences in, e.g., average differences in x, y positions, differences in the center of gravity of multiple landmarks, or other differences that account for, e.g., the reliability with which particular landmarks are identified, the spatial relationships amongst the landmarks themselves and the orientation of the object and/or camera, and other parameters.

Figure 7:
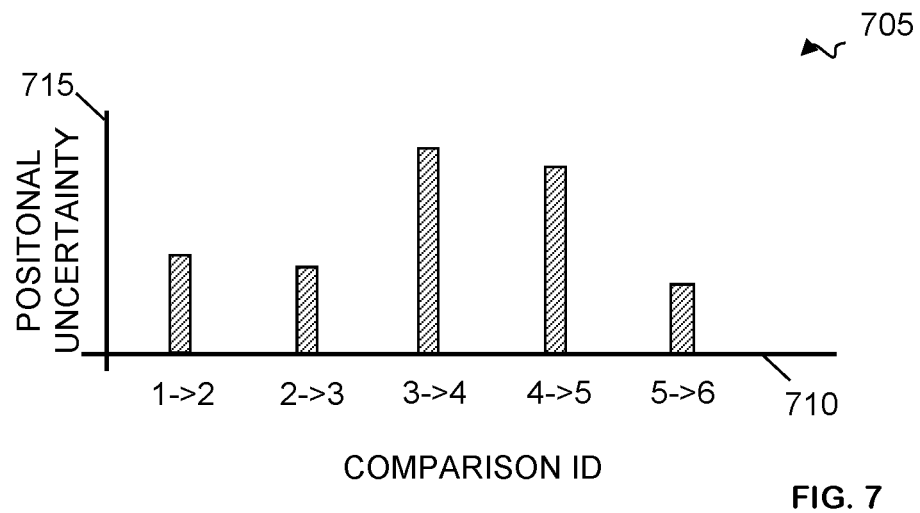
FIG. 7 schematically represents positional differences of groups of landmarks.

FIG. 7 schematically represents positional differences 705 of groups of landmarks. Positional differences 705 are presented in a bar graph that includes an x-axis 710 and a y-axis 715. Each bar along x-axis 710 indicates the collective positional differences of two groups of landmarks in an iteration of process 300. In the illustrated implementation, the bars are designated using the following notation: "1→2," "2→3," This notation indicate that a bar is associated with an iteration in which landmarks were transferred from a first image (e.g., image 1, image 2, . . . ) to an estimated position and/or orientation of a second image (e.g., image 2, image 3, . . . ).

The height of the bar along y-axis 715 indicates uncertainty in the collective positional differences. For example, the height can reflect, e.g., the sum of the distances between the positions of corresponding landmarks in the group.

By making comparisons of successive iterations, details about particular pose estimates can be discerned. For example, in positional differences 705, it appears that every comparison that involves image 4 has a larger positional uncertainty than the comparisons involving other images. This larger positional uncertainty can be taken as an indication that the pose estimate made from image 4 is less correct than the pose estimate made from other images.

Figure 8:
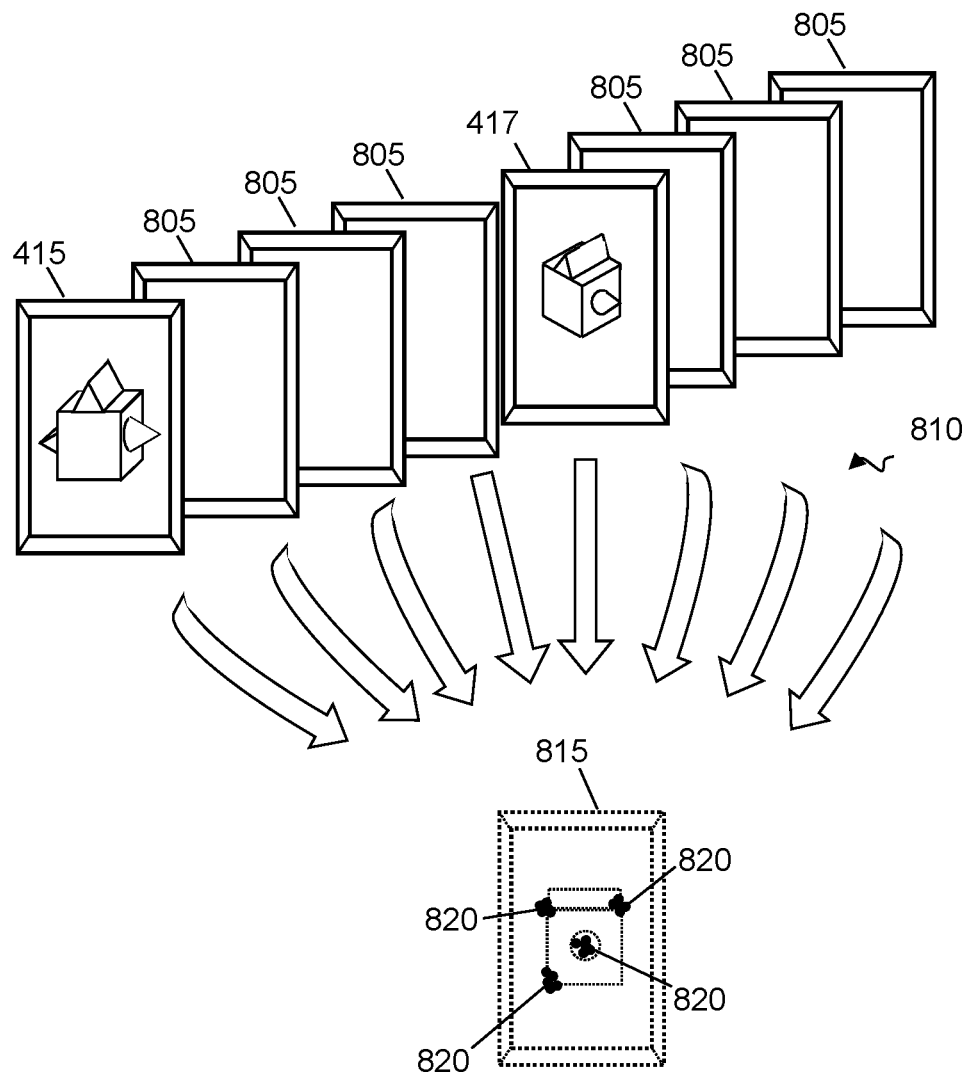
FIG. 8 is a schematic representation of how multiple iterations of the process of FIG. 3 can be used to insure that the results are sufficiently correct.

FIG. 8 is a schematic representation of how multiple iterations of process 300 can be used to insure that the results of landmark detection and pose estimation are sufficiently correct. In particular, rather than comparing the position of landmarks that are transferred from a single image with the position of landmarks in another image, landmarks can be transferred from multiple images and then compared. For example, in the implementation illustrated, landmarks can be transferred from both of images 415, 417—and possibly one or more other images 805 at different positions and/or orientations. As before, the transfer is schematically represented for illustrative purposes as a collection of arrows 710 and a hypothetical new image 815.

The transfer from multiple images 415, 417, 805 yields clusters 820 of different landmarks in the hypothetical new images that would result given the differences between the positions and/or orientations at which images 415, 417, 805 are acquired and position and/or orientation 414.

The characteristics of the clusters 820 can be determined and used to characterize the correctness of image processing on a landmark-by-landmark basis. For example, a very narrow spread in a cluster indicates that landmark detection and pose estimation is more correct, whereas a wide spread indicates that landmark detection and pose estimation is less correct. The spread of positions in a cluster can be determined in a number of ways. For example, in some implementations, the positional deviation of individual landmarks from the average position of corresponding landmarks can be taken as a measure of the correctness of landmark detection and pose estimation.

In other implementations, the landmarks transferred from different images 415, 417, 805 can be filtered prior to averaging to remove outliers and incorrect landmarks and pose estimates.

In still other implementations, the positions of landmarks can be weighted before averaging. For example, the positions can be weighted according to how close the position and/or orientation of the source image 415, 417, 805 is to the position and/or orientation 414 of image 419. Such a weighting would reduce the impact of any error due to the estimating the difference in position and/or orientation of either object or camera in the source image 415, 417, 805 and image 419.

Figure 9:
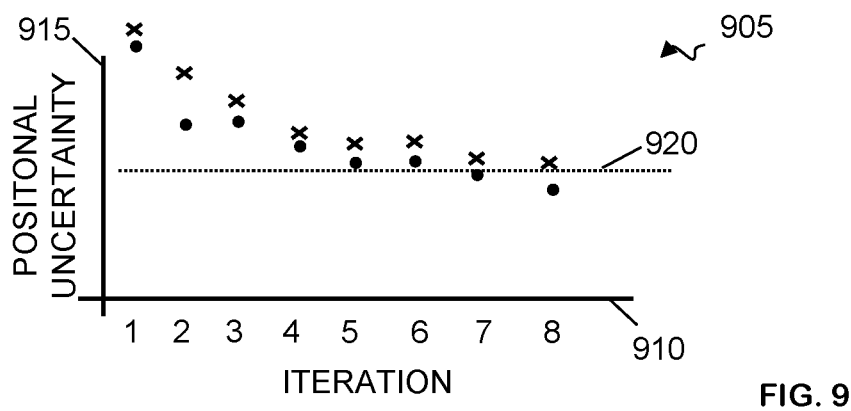
FIG. 9 schematically represents how multiple iterations of the process of FIG. 3 can be used to characterize the results of image processing in a graph.

FIG. 9 schematically represents how multiple iterations of process 300 can be used to characterize the results of image processing in a graph 905. Graph 905 includes an x-axis 910 and a y-axis 915. Position along x-axis 910 indicates the iteration number, i.e., the number of times that landmarks are transferred from an image to another position and/or orientation between an imaging device and an object. Position along y-axis 915 indicates the uncertainty in the position of individual landmarks when the results of the different transfers are combined. For example, position along y-axis 915 can reflect the spread of a cluster, e.g., how precisely the transferred landmark positions identify the position of the landmark in a particular position and/or orientation.

In graph 905, the positional uncertainty for a first landmark is shown as solid dots, whereas the positional uncertainty for a second landmark is shown as x's. In general, as the number of images from which landmarks are transferred increases, the positional uncertainty will decrease. Further, as the number of images from which landmarks are transferred increases, the positional uncertainty of a landmark will generally asymptotically approach a minimum value. This minimum value can be taken as the standard error of the image processing.

Also illustrated in graph 905 is a threshold level 920. Threshold level 920 can designate a level at which positional uncertainty is sufficiently low and/or unacceptably high. In some implementations, threshold level 920 can be used as part of an interactive process to insure that a sufficient number and/or quality of images (e.g., images 415, 417, 805) are acquired and processed. For example, in a scenario in which an individual is taking pictures or video of a parked car using a smart phone, the individual can be instructed to continue to acquire images until an acceptably low positional uncertainty has been achieved.

Figure 10:
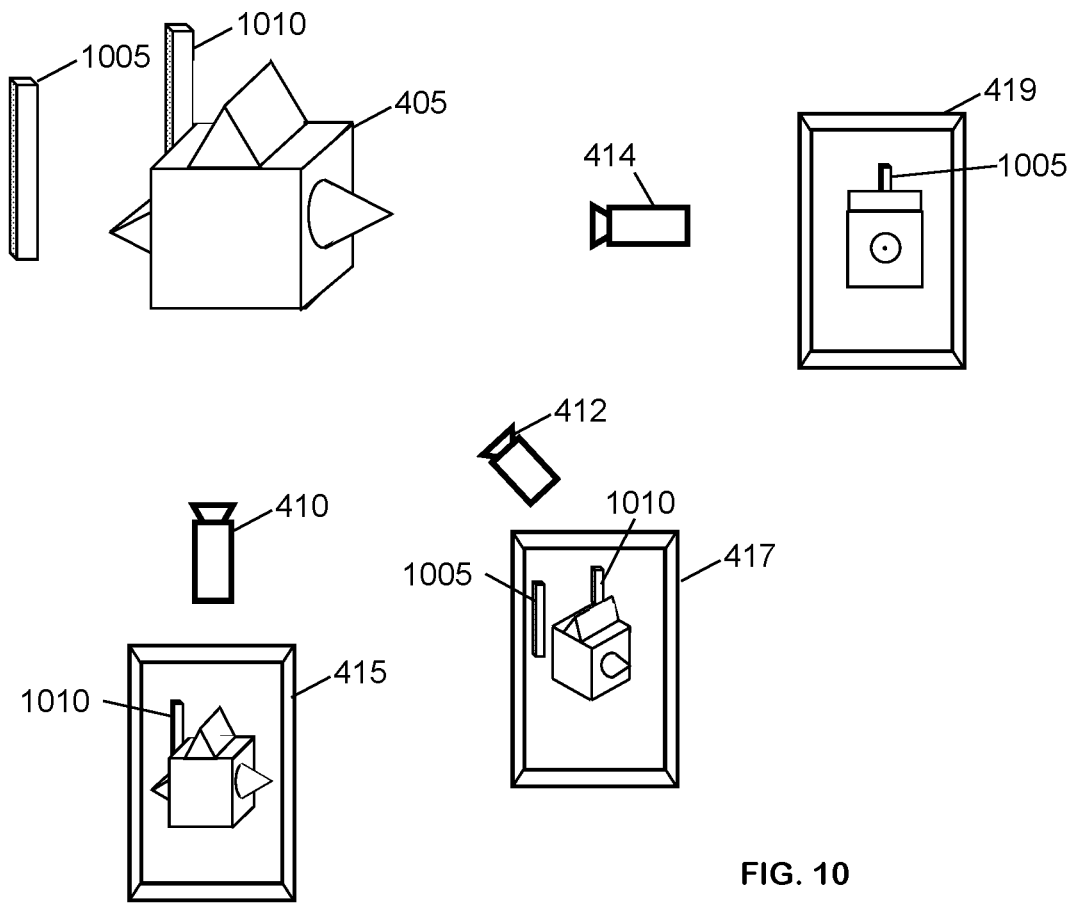
FIG. 10 is a schematic representation of an implementation of the process of FIG. 3 that relies upon information that is internal to the received images to estimate the difference in position and/or orientation of the object or camera in different images.

FIG. 10 is a schematic representation of an implementation of process 300 that relies upon information that is internal to the received images to estimate the difference in position and/or orientation of the object or camera in different images.

In the illustrated implementation, object 405 is in the vicinity of other objects 1005, 1010. The exact nature of objects 1005, 1010 will depend on the particular scenario. For example, objects 1005, 1010 can be vehicles, buildings, or features of a landscape. As another example, objects 1005, 1010 can be infrastructure components in the vicinity of an assembly line, including, e.g., lights, rails, floor markings, or the like. In the illustrated implementation, objects 1005, 1010 are separate from object 405 and not part of object 405. This is not necessarily the case. For example, in some implementations, components or other parts of object 405 can be used to estimate the difference in position and/or orientation of the object or camera in different images.

Nevertheless, information other than the information used to estimate the relative poses at 310 is used to estimate the difference in position and/or orientation of the object or camera in different images. For example, the relative poses can be estimated at 310 using some parts/components of object 405, whereas the differences in position and/or orientation of the object or camera in different images can be estimated using other parts/components of object 405.

Figure 11:
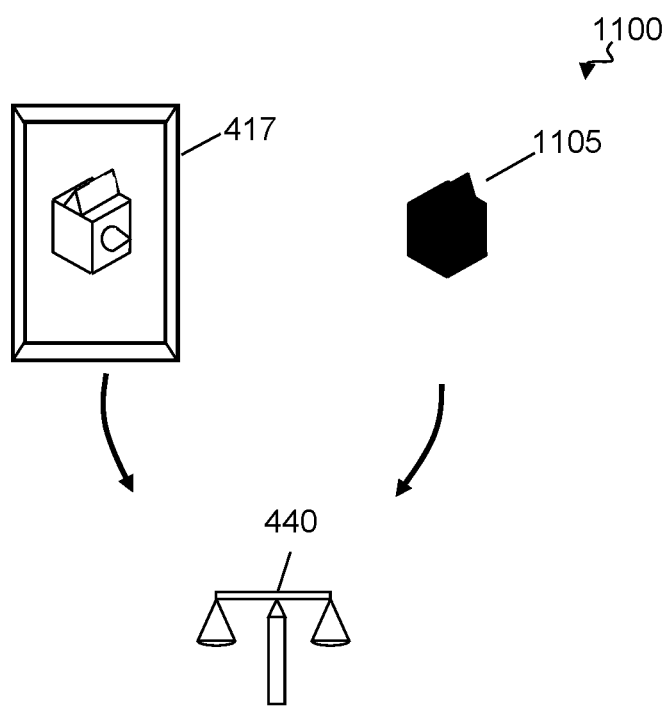
FIG. 11 is a schematic representation of a process for comparing a relative pose transferred from a first image with a relative pose estimated from a second image.

FIG. 11 is a schematic representation of a process 1100 for comparing a relative pose transferred from a first image with a relative pose estimated from a second image. For example, process 1100 can be performed at 325 in process 300 at using a pose transferred at 320 and a pose estimated at 310 (FIG. 3). In process 1100, relative pose estimates are compared by comparing an outer boundary of an object in an image and an outer boundary of an object that is transferred from another image. The correspondence between the outer boundaries characterizes the correctness of the pose estimates.

As with comparisons that rely upon the position of landmarks, comparisons that rely upon the outer boundaries or other parameters to characterize correctness can be made across multiple iterations of process 300 to characterize the results of image processing. Further, the results of transfers can be combined and compared, e.g., with a threshold to determine is the pose estimates are sufficiently correct. Also, rather than comparing the outer boundary (or other parameters) of the pose estimates as a unitary whole, portions of the outer boundary (or other parameters) can be compared to locally characterize the correctness of pose estimation. For example, a close match of the pose estimates at a bottom region of an object may indicate that the pose estimates are more correct in this region and poor matches of the pose estimates at another region may indicate that the pose estimates are less correct in this other region.

Characterizations of the results of image processing—including results 505, 510 (FIG. 5), 705 (FIG. 7), 905 (FIG. 9) can be used in a variety of different ways.

For example, in some implementations, the characterizations can be used to discard certain results as insufficiently correct or inadequate. For example, with reference to FIG. 7, pose estimates made from image 4 may be considered insufficiently correct and pose estimates made from image 4 may be discarded or filtered from subsequent image processing. As another example, image acquisition can be continued or repeated to ensure that positional uncertainly is below a threshold. An example is shown, e.g., FIG. 9.

In some implementations, rather than merely acquiring more images, image acquisition can be controlled or improved by acquiring different images, e.g., images from different relative positions or zooms, images with different exposures, images with different optical filters and/or illumination sources (e.g., color, intensity, polarization), images with different frame rates, of the like.

Figure 12:
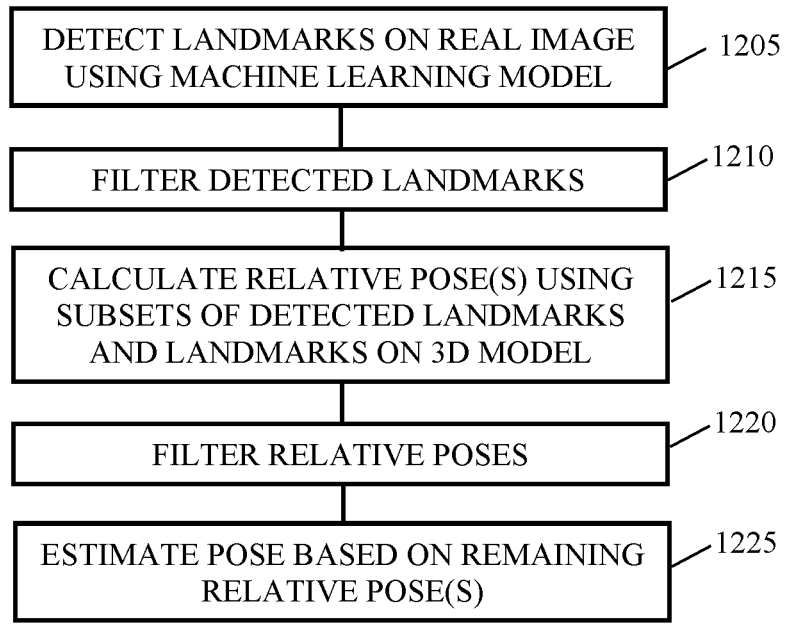
FIG. 12 is a flowchart of a process for estimating relative poses between an imaging device and an object using a machine-learning model for landmark detection.

FIG. 12 is a flowchart of a process 1200 for estimating relative poses between an imaging device and an object using a machine-learning model for landmark detection. Process 1200 can be performed by one or more data processing devices that perform data processing activities, e.g., in accordance with the logic of a set of machine-readable instructions, a hardware assembly, or a combination of these and/or other instructions. Process 1200 can be performed in isolation or in conjunction with other activities. For example, process 1200 can be performed at 310 in process 300 (FIG. 3).

The pose recognition implemented by process 1200 can provide a high-quality estimation of the relative pose of the camera and an object that is at least partially visible in a real-world two-dimensional image.

Figure 13:
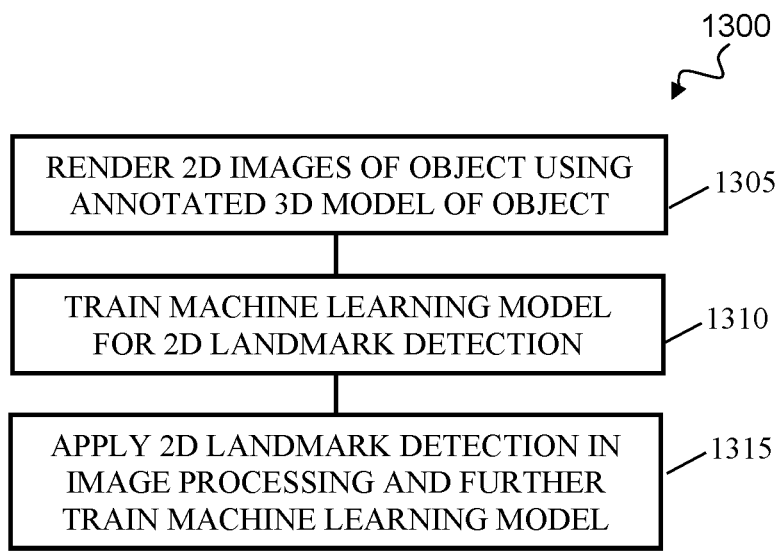
FIG. 13 is a flow chart of a process for producing landmark detector that is capable of detecting landmarks in real two-dimensional images using an annotated 3D model.

At 1205, the system performing process 1200 detects landmarks on a real two-dimensional image of an object using a machine-learning model for landmark detection. In some implementations, the machine learning model for landmark detection is produced using a process 1300 (FIG. 13). The landmarks in the real, two-dimensional image will be two-dimensional landmarks.

At 1210, the system performing process 1200 filters the detected two-dimensional landmarks to yield one or more subsets of the detected landmarks. In some implementations, the filtering can include determining a correspondence between:

landmarks on a 3D model of the object, and
the detected two-dimensional landmarks.

For example, a collection of pairs of two-dimensional landmarks (detected in the real image) and three-dimensional landmarks (present on the 3D model of the object) can be determined.

In any case, various filtering operations can be used to prefilter these pairs and yield subset(s) of the detected landmarks and corresponding landmarks on the 3D model. For example, two-dimensional landmarks from the real image that are close to the outer boundary of the object in the real image can be removed. The boundary of the object can be identified in a variety of different ways, including, e.g., computer vision techniques. In some instances, the boundary of the object can be detected using the same landmarks detected by the machine-learning model for landmark detection at 705.

As another example of a filtering operation, two-dimensional landmarks detected by the machine-learning model and that are close to one another in the real two-dimensional image can be filtered at random so that at least one landmark remains in the vicinity. The distance between two-dimensional landmarks can be measured, e.g., in pixels. In some implementations, two-dimensional landmarks are designated as close if their distance is, e.g., 2% the width or height of the image or less or 1% the width or height of the image or less.

As yet another example of a filtering operation, one or more landmarks on the 3D model can be swapped with other symmetric landmarks on the 3D model. For example, in implementations where the object is an automobile, landmarks on the 3D model at the passenger's side of the automobile can be swapped with landmarks at the driver's side. For objects that have other symmetrical or near-symmetrical relationships (e.g., rotational about a point or axis), correspondingly tailored swapping of landmarks can be used.

At 1215, the system performing process 1200 calculates one or more candidate relative poses for the camera and the object using the subset(s) of the detected landmarks. The relative poses can be calculated in a variety of different ways. For example, a computer vision approach such as SolvePnP with random sample consensus (available at the OpenCV library https://docs.opencv.org/4.4.0/d9/d0c/group_calib3d.html#ga549c2075fac14829ff4a58bc931c033d) can be used to solve the so-called "perspective-n-point problem" and calculate a relative pose based on pairs of two-dimensional and three-dimensional landmarks.

Such computer vision approaches tend to be resilient to outliers, i.e., pairs of landmarks where the detected 2D landmark location is far from the actual location. However, computer vision approaches are often not resilient enough to consistently overcome common imperfections in landmark detectors, including, e.g., two-dimensional landmarks that are invisible in a real image but are predicted to be in the corners of the real image or at the edges of the object, landmarks that cannot reliably be identified as either visible or hidden behind the object, predictions of two-dimensional landmarks that are either unreliable or inaccurate, symmetric landmarks that are exchanged for one another, visually similar landmarks that are detected at the same location, and detection of multiple, clustered landmarks in regions with a complex local structures. By filtering the detected two-dimensional landmarks at 710, the system performing process 700 can avoid these issues.

At 1220, the system performing process 1200 filters the candidate relative pose(s) calculated using the subset(s) of the detected landmarks. The filtering can be based on a set of criteria that define potentially acceptable poses for the object in the real image. In general, the criteria reflect real-world conditions in which the real image is likely to be taken and can be tailored according to the nature of the object. For example, for candidate relative poses in which the object is an automobile:
- the camera should be at an altitude of between 0 meters and 5 meter relative to the ground under the automobile,
- the camera should be within 20 m of the automobile,
- the roll of the camera relative to the ground under the automobile is small (e.g., less than +/−10 degrees),
- the position of two-dimensional landmarks in the estimated pose should be consistent with the positons of the corresponding landmarks on the 3D model, e.g., as determined by back-projection of the two-dimensional landmarks in the real image onto the 3D model, and
- the boundary of the object identified by another technique should largely match the boundary of the object that would result from the predicted pose.

If a candidate relative pose does not satisfy such criteria, then it can be discarded or otherwise excluded from subsequent data processing activities.

At 1225, the system performing process 1200 estimates the relative pose of the object in the real image based on the remaining (unfiltered) candidate relative poses. For example, if only a single candidate relative pose remains, it can be considered to be final estimate of the relative pose. As another example, if multiple candidate relative poses remain, a difference between the candidate relative poses can be determined and used to conclude that the relative pose has been reasonably estimated. The remaining candidate relative poses can then be averaged or otherwise combined to estimate the relative pose.

FIG. 13 is a flow chart of a process for producing landmark detector that is capable of detecting landmarks in real two-dimensional images using an annotated 3D model. Process 1300 can be performed by one or more data processing devices that perform data processing activities, e.g., in accordance with the logic of a set of machine-readable instructions, a hardware assembly, or a combination of these and/or other instructions. Process 1300 can be performed in isolation or in conjunction with other activities. For example, process 1200 (FIG. 12) can be performed using a machine learning model for landmark detection that is produced and tailored to pose recognition in process 1300.

At 1305, the system performing process 1300 renders a collection of two-dimensional images of the object using an annotated 3D model of the object. Ray tracing or other computer graphic techniques can be used. As before, it is generally desirable that the two-dimensional images are as variable as possible. A variety of different relative poses and/or perturbations in the object, the imaging device, image processing, and imaging conditions can be used to generate a diverse collection of two-dimensional images. In some implementations, new renderings need not be generated. Rather, existing renderings can simply be annotated by adding appropriate annotations from the 3D model with perfect knowledge derived from the 3D model.

At 1310, the system performing process 1300 trains a machine learning model for landmark detection in real-world two-dimensional images using the two-dimensional images rendered using the annotated 3D model of the object. An example machine learning model for landmark detection is the detectron2 available at https://github.com/facebookresearch/detectron2.

At 1315, the system performing process 1300 applies the machine learning model for two-dimensional landmark detection that has been trained using the surrogate two-dimensional images in a particular type of image processing. Further, the same machine learning model can be further trained by rejecting certain results of the image processing as incorrect.

In more detail, landmark detection can be used, e.g., in image classification, feature extraction, pattern recognition, pose estimation, and projection. A training set that is developed using the surrogate two-dimension images rendered from the 3D model can be used to further train the machine learning model for landmark detection to the particular image processing.

For example, as discussed above, a two-dimensional landmark detection machine learning model can be applied to pose recognition. In particular, the correspondences between landmarks detected on the surrogate two-dimensional images and landmarks on the 3D model can be used to determine the relative poses of the object in the surrogate two-dimensional images. Those pose predictions can be reviewed to invalidate poses that do not satisfy certain criteria. In some implementations, the criteria for invalidating a pose prediction are established based on the criteria that used when rendering the surrogate two-dimensional images from the 3D model. For example, if the relative poses of the imaging device and the object are constrained when rendering the surrogate two-dimensional images (e.g., a range of relative angles or positions), predicted poses that fall outside those constraints can be labeled as incorrect and used, e.g., as negative examples in further training of the machine learning model for landmark detection.

In other implementations, the predicted poses can be limited to criteria that are independent of any criteria that are used when rendering the surrogate two-dimensional images from the 3D model. For example, the predicted poses can be limited to poses that are likely to be found in real-world pose prediction. Poses that are rejected under such criteria would not necessarily be useful as negative examples, but rather simply omitted since landmark detection need not be performed outside of realistic conditions.

Regardless of whether the criteria are or are not used when rendering the surrogate two-dimensional images from the 3D model, predicted poses can be constrained, e.g., to a defined range of distances between the camera and the object (e.g., between 1-20 meters) and/or a defined range of roll along the axis between the camera and the center of the object (e.g., less than +/−10 degrees).

As another example, other computer-implemented techniques can be used to reject pose predictions as incorrect. For example, a variety of computer-implemented techniques—including computer graphic techniques (e.g., ray tracing) and computer vision techniques (e.g., semantic segmentation and active contours models) can be used to identify the boundary of an object. If the boundary of the object identified by such a technique does not match the boundary of the object that would result from the predicted pose, the predicted pose can be rejected as incorrect.

Process 1300 can thus further tailor landmark detection machine learning model to a particular type of image processing without reliance on real images during training.

Figure 14:
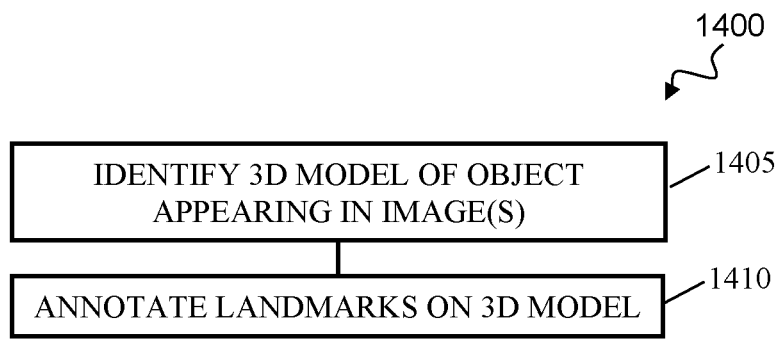
FIG. 14 is a flowchart of a computer-implemented process for processing images of an object.

FIG. 14 is a flowchart of a computer-implemented process 1400 for processing images of an object, such as images 205, 210, 215, 220 (FIG. 2). Process 1400 can be performed by one or more data processing devices that perform data processing activities. The activities of process 1400 can be performed in accordance with the logic of a set of machine-readable instructions, a hardware assembly, or a combination of these and/or other instructions.

As discussed above, depending on the captured pose, landmarks on an object can appear at different locations in different photographic images. Process 1400 produces a landmark detector that has been trained using machine learning techniques to identify landmarks in photographic images of an object. The identified landmarks can be used in a variety of different image processing applications, including pose estimation, image classification, feature extraction, pattern recognition, and others. Process 1400 can thus be performed independently or as part of a larger collection of activities. For example, process 1400 can be performed to generate an annotated 3D model that is used in process 1200 (FIG. 12).

At 1405, the device performing process 1400 identifies a 3D model of a physical object that appears in one or more images that are to be processed. The 3D model can represent the object in three-dimensional space, generally divorced from any frame of reference. 3D models can be created manually, algorithmically (procedural modeling), or by scanning real objects. Surfaces in a 3D model may be defined with texture mapping.

In many cases, a single 3D model will include several different constituent parts. Parts of an object are pieces or volumes of the object and are generally distinguished from other pieces or volumes of the object, e.g., on the basis of function and/or structure. For example, the parts of an automobile can include, e.g., bumpers, wheels, body panels, the hood, windshields, and hoods. The parts of an organ can include, e.g., chambers, valves, cavities, lobes, canals, membranes, vasculature, and the like. The parts of a plant can include roots, stems, leaves, and flowers. Depending on the nature of the 3D model, the 3D model may itself be divided into 3D models of the constituent parts. For example, a 3D model of an automobile generated using computer-aided design (CAD) software may be an assembly of 3D CAD models of the constituent parts. However, in other cases, a 3D model can start as a unitary whole that is subdivided into constituent parts. For example, a 3D model of an organ can be divided into various constituent parts under the direction of a medical or other professional.

In some cases, data that identifies the object that appears in the image(s) can be received from a human user. For example, a human user can indicate the make, model, and year of an automobile that appears in the image(s). In other cases, a human user can indicate the identity of an human organ or the species of a plant that appears in the image(s). In other implementations, the object can be identified using image classification techniques. For example, convolutional neural network can be trained to output a classification label for an object or a part of an object in an image.

A 3D model of the object can be identified in a variety of different ways. For example, a pre-existing library of 3D models can be searched using data that identifies the object. Alternatively, a manufacturer of a product can be requested to provide a 3D model or a physical object can be scanned.

At 1410, the device performing process 1400 annotates landmarks that appear on the 3D model. As discussed above, these landmarks are positions of interest on the 3D model and can be identified and annotated on the 3D model.

Figure 15:
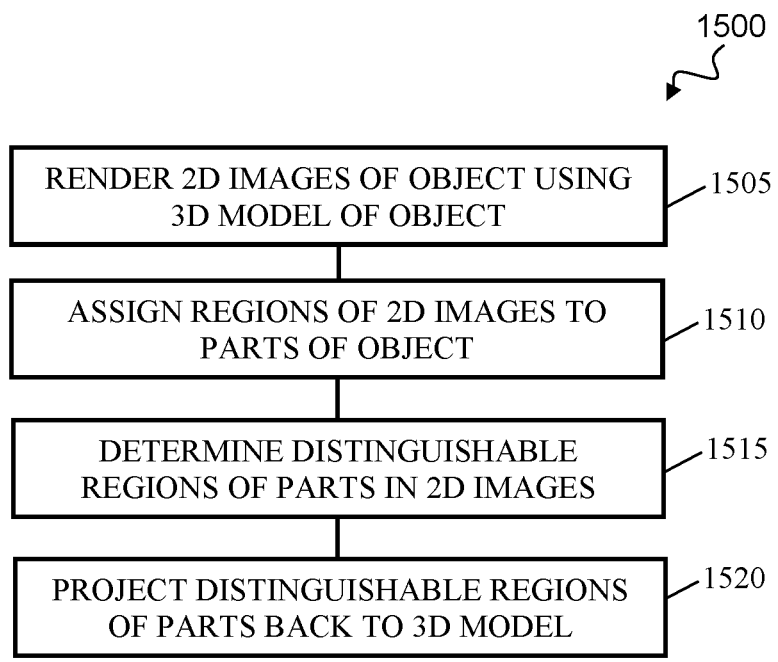
FIG. 15 is a flowchart of a computer-implemented process for annotating landmarks that appear on a 3D model.

FIG. 15 is a flowchart of a computer-implemented process 1500 for annotating landmarks that appear on a 3D model. Process 1500 can be performed by one or more data processing devices that perform data processing activities, e.g., in accordance with the logic of a set of machine-readable instructions, a hardware assembly, or a combination of these and/or other instructions. Process 1500 can be performed in isolation or in conjunction with other activities. For example, process 1500 can be performed at 1510 in process 1400 (FIG. 14).

At 1505, the system performing process 1500 renders a collection of two-dimensional images of an object using a 3D model of the object that is formed of constituent parts. The two-dimensional images are not actual images of a real-world instance of the object. Rather, the two-dimensional images can be thought of as surrogates for images of the real world object. These surrogate two-dimensional images show the object from a variety of different angles and orientations—as if a camera were imaging the object from a variety of different relative poses.

The two-dimensional images can be rendered using the 3D model in a number of ways. For example, ray tracing or other computer graphic techniques can be used. In general, the 3D model of the object is perturbed for rendering the surrogate two-dimensional images. Different surrogate two-dimensional images can thus illustrate different variations of the 3D model. In general, the perturbations can mimic real-world variations in the objects—or parts of the objects—that are represented by the 3D model. For example, in 3D models of automobiles, the colors of the exterior paint and the interior decor can be perturbed. In some cases, parts (tires, hubcaps, and features like roof carriers) can be added, removed, or replaced. As another example, in 3D models of organs, physiologically relevant size and relative size variations can be used to perturb the 3D model.

In some implementations, aspects other than the 3D model can be perturbed to further vary the two-dimensional images. In general, the perturbations can mimic real-world variations including, e.g.,
- variations in imaging devices (e.g., camera resolution, zoom, focus, aperture speed),
- variations in image processing (e.g., digital data compression, chroma subsampling), and
- variations in imaging conditions (e.g., lighting, weather, background colors and shapes).

In some implementations, the two-dimensional images are rendered in a frame of reference. The frame of reference can include background features that appear behind the object and foreground features that appear in front of—and possibly obscure part of—the object. In general, the frame of reference will reflect the real-world environment in which the object is likely to be found. For example, an automobile may be rendered in a frame of reference that resembles a parking lot, whereas an organ may be rendered in a physiologically relevant context. The frame of reference can also be varied to further vary the two-dimensional images.

In general, it is desirable that the two-dimensional images are highly variable. Further, the number of surrogate two-dimensional images—and the extent of the variations—can depend on the complexity of the object and the image processing that is ultimately to be performed using the annotated landmarks on the 3D model. By way of example, 2000 or more highly variable (in relative pose and permutation) surrogate two-dimensional images of an automobile can be rendered. Because the two-dimensional images are rendered from a 3D model, perfect knowledge about the position of the object in the two-dimensional images can be retained regardless of the number of two-dimensional images and the extent of variation.

At 1510, the system performing process 1500 assigns each region of an object shown in the two-dimensional images to a part of the object. As discussed above, a 3D model of an object can be divided into distinguishable constituent parts on the basis of function and/or structure. When a surrogate two-dimensional image of the 3D model is rendered, the part to which each region in the two-dimensional image belongs can be preserved. The regions—which can be pixels or other areas in the two-dimensional image—can thus be assigned to corresponding constituent parts of the 3D model with perfect knowledge derived from the 3D model.

At 1515, the system performing process 1500 determines distinguishable regions of the parts in the two-dimensional images. A distinguishable region of a part is an area (e.g., a pixel or group of pixels) that can identified in the surrogate two-dimensional images using one or more image processing techniques. For example, in some implementations, corners of the regions in each image that are assigned to the same part are detected using, e.g., a Moravec corner detector or a Harris Corner Detector (https://en.wikipedia.org/wiki/Harris_Corner_Detector). As another example, an image feature detection algorithm such as, e.g. SIFT/SURF/HOG/https://en.wikipedia.org/wiki/Scale-invariant_feature_transform) can be used to define distinguishable regions.

At 1520, the system performing process 1500 identifies a collection of landmarks in the 3D model by projecting the distinguishable regions in the two-dimensional images back onto the 3D model. Volumes on the 3D model that correspond to the distinguishable regions in the two-dimensional images are identified as landmarks on the 3D model.

In some implementations, one or more filtering techniques can be applied to reduce the number of these landmarks and to ensure quality—either before or after back-projection onto the 3D model. For example, in some implementations, regions that are close to an outer boundary of the object in the surrogate two-dimensional image can be discarded prior to back-projection. As another example, back-projections of regions that are too distant from a corresponding part in the 3D model can be discarded.

In some implementations, only volumes on the 3D model that satisfy a threshold standard are identified as landmarks. The threshold can be determined in a number of ways. For example, the volumes that are candidate landmarks on the 3D model and identified by back-projection from different two-dimensional images rendered with different relative poses and perturbations can be collected. Clusters of candidate landmarks can be identified and outlier candidate landmarks can be discarded. For example, clustering techniques such as the OPTICS algorithm (https://en.wikipedia.org/wiki/OPTICS_algorithum, a variation of DBSCAN https://en.wikipedia.org/wiki/DBSCAN) can be used to identify clusters of candidate landmarks. The effectiveness of the clustering can be evaluated using, e.g., Calinski-Harabasz index (i.e., the Variance Ratio Criterion) or other criterion. In some implementations, the clustering techniques can be selected and/or tailored (e.g., by tailoring hyper-parameters of the clustering algorithm) to improve the effectiveness of clustering. If needed, candidate landmarks that are in a cluster and closer together than a threshold can be merged. In some implementations, candidate landmarks clusters that are on different parts of the 3D model can also be merged into a single cluster. In some implementations, the barycenters of several candidate landmarks in a cluster can be designated as a single landmark.

In some implementations, the landmarks in the 3D model can be filtered on the basis of the accuracy with which their position in surrogate two-dimensional images rendered from the 3D model can be predicted. For example, if the position of 3D landmark in a two-dimensional image is too difficult to predict (e.g., incorrectly predicted above a threshold percent of the time or predicted only with a poor accuracy), then that 3D landmark can be discarded. As a result, only 3D landmarks with positions in two-dimensional images that the landmark predictor can be predict relatively easily will remain.

In some instances, the number of landmarks that are identified can be tailored to a particular data processing activity. The number of landmarks can be tailored in a number of ways, including, e.g.:
- at 1505, rendering more or fewer two-dimensional images, especially using more or fewer permutations of the 3D model;
- dividing the 3D model into more or fewer parts to which regions are assigned at 1510;
- relaxing or tightening a constraint for considering a region to be distinguishable at 1515; and/or
- relaxing or tightening constraints for filtering landmarks after back-projecting the distinguishable regions onto the 3D model after 1520.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made. Accordingly, other implementations are within the scope of the following claims.

What is claimed is:

1. A method for characterizing correctness of image processing, the method comprising:
   receiving images of an instance of an object, wherein the images were acquired at different relative poses;
   identifying positions of corresponding landmarks on at least a first portion of the instance of the object in each of the received images;
   receiving information characterizing a difference in position or a difference in orientation of at least one of
      the instance of the object and
      one or more imaging devices when the images were acquired,
   wherein receiving the information characterizing the difference in position or the difference in orientation comprises
      identifying either a second, different object or a second, different portion of the instance of the object in the images of the instance of the object, and
      determining the difference in position or the difference in orientation based on the second object or the second portion of the instance of the object, wherein the at least the first portion of the instance of the object used for identifying corresponding landmarks is excluded from the determination of the difference in position or the difference in orientation;
   transferring the positions of landmarks identified in a first of the images based on the difference in position or the difference in orientation to obtain transferred landmarks on the first portion of the object;
   comparing the positions of the transferred landmarks with the positions of the corresponding of the landmarks identified in a second of the received images; and
   characterizing, based on the comparison of the positions of the transferred landmarks with the positions of the corresponding of the landmarks on at least the first portion of the instance of the object, a correctness of the identification of the positions of the landmarks in at least one of the received images.

2. The method of claim 1, wherein identifying the positions of the corresponding landmarks comprises estimating relatives poses of the object and the one or more imaging devices.

3. The method of claim 1, wherein the information characterizing the difference in position or the difference in orientation characterizes a different of both of the object and the imaging device or devices.

4. The method of claim 1, wherein the characterizing the correctness of the identification of the positions of the landmarks comprises:
   transferring the positions of landmarks identified in a second and a third of the images based on respective differences in position or differences in orientation; and
   combining the transferred landmarks from the first, the second, and the third of the images.

5. The method of claim 4, wherein characterizing the correctness of the identification of the positions of the landmarks further comprises comparing the positions of the combined transferred landmarks with the positions of the corresponding of the landmarks identified in the second of the received images.

6. The method of claim 1, wherein transferring the positions of landmarks comprises:
   receiving a three-dimensional model of the object; and
   projecting the three-dimensional model of the object to determine the positions of the landmarks.

7. The method of claim 1, further comprising:
   comparing the correctness of the identification of the positions of the landmarks to a threshold level of correctness; and
   in response to determining that the correctness of the estimation of the relative pose does not satisfy the threshold level of correctness, receiving one of more additional images of the instance of the object and identifying positions of corresponding landmarks, receiving information characterizing the difference, transferring positions of the landmarks, comparing the positions of the transferred landmarks, and characterizing a correctness of the identification of the positions of the landmarks for the one of more additional images.

8. The method of claim 1, further comprising:
   comparing the correctness of the identification of the positions of the landmarks to a threshold level of correctness; and
   in response to determining that the correctness of the estimation of the relative pose does not satisfy the threshold level of correctness, excluding the identification of the positions of the landmarks from further image processing.

* * * * *